(12) United States Patent
Morris et al.

(10) Patent No.: US 12,207,650 B2
(45) Date of Patent: Jan. 28, 2025

(54) APPARATUS AND METHODS RELATING TO FREEZING AT LEAST PART OF A BIOLOGICAL SAMPLE

(71) Applicant: Asymptote Ltd., Cambridgeshire (GB)

(72) Inventors: George Morris, Cambridgeshire (GB); Stephen Lamb, Cambridgeshire (GB); Peter Kilbride, Cambridgeshire (GB)

(73) Assignee: Asymptote Ltd., Cambridge (GB)

( * ) Notice: Subject to any disclaimer, the term of this patent is extended or adjusted under 35 U.S.C. 154(b) by 758 days.

(21) Appl. No.: 16/955,858

(22) PCT Filed: Dec. 20, 2018

(86) PCT No.: PCT/EP2018/086163
§ 371 (c)(1),
(2) Date: Jun. 19, 2020

(87) PCT Pub. No.: WO2019/122106
PCT Pub. Date: Jun. 27, 2019

(65) Prior Publication Data
US 2020/0329700 A1    Oct. 22, 2020

(30) Foreign Application Priority Data
Dec. 22, 2017 (GB) ...................... 1721824

(51) Int. Cl.
*A01N 1/00*    (2006.01)
*A01N 1/02*    (2006.01)

(52) U.S. Cl.
CPC ......... *A01N 1/0257* (2013.01); *A01N 1/0263* (2013.01); *A01N 1/0284* (2013.01)

(58) Field of Classification Search
CPC .. A01N 1/0257; A01N 1/0263; A01N 1/0268; A01N 1/0284
See application file for complete search history.

(56) References Cited

U.S. PATENT DOCUMENTS

| | | | |
|---|---|---|---|
| 4,565,073 A | | 1/1986 | Lavender |
| 4,736,316 A | * | 4/1988 | Wallman ............... G05B 13/045 |
| | | | 700/39 |

(Continued)

FOREIGN PATENT DOCUMENTS

| | | |
|---|---|---|
| CN | 2049746 U | 12/1989 |
| CN | 206528805 U | 9/2017 |

(Continued)

OTHER PUBLICATIONS

PCT International Search Report and Written Opinion for PCT Application No. PCT/EP2018/086163 mailed Jun. 13, 2019 (21 pages).

(Continued)

*Primary Examiner* — Filip Zec
(74) *Attorney, Agent, or Firm* — Eversheds-Sutherland (US) LLP

(57) ABSTRACT

Disclosed is a device for use in freezing at least part of a biological sample in a receptacle, e.g. a vial or a cryopreservation bag, the device comprising: a base; and a receptacle holder comprising: a first part configured to, with the receptacle held by the receptacle holder during cooling of the base using a cooler device, withdraw heat energy from a first portion of the receptacle at a first heat withdrawal rate; and a second part configured such that, with the receptacle held by the receptacle holder during cooling of the base using the cooler device, a second heat withdrawal rate of heat energy withdrawal from a second portion of the receptacle via the second part is less than the first heat withdrawal rate. A temperature gradient may be established in the sample to enable progressive solidification to occur in the sample. A receptable for use in freezing a biological sample, and a freezing method are disclosed also.

30 Claims, 11 Drawing Sheets

(56) References Cited

U.S. PATENT DOCUMENTS

| | | | |
|---|---|---|---|
| 5,059,399 A | | 10/1991 | Schilling |
| 5,205,128 A * | | 4/1993 | Richard ................ F25D 16/00 |
| | | | 62/63 |
| 5,226,715 A * | | 7/1993 | Delatte .................. E05C 19/06 |
| | | | 292/87 |
| 5,249,436 A * | | 10/1993 | Hemsath ................ F25B 17/02 |
| | | | 62/476 |
| 5,685,438 A * | | 11/1997 | Emanuel ............. B65D 5/5038 |
| | | | 211/70.1 |
| 5,873,254 A * | | 2/1999 | Arav .................... A01N 1/0257 |
| | | | 62/65 |
| 6,640,981 B2 * | | 11/2003 | Lafond ..................... B01L 9/06 |
| | | | 422/561 |
| 7,758,811 B2 * | | 7/2010 | Durack .................... C12Q 1/02 |
| | | | 436/63 |
| 7,861,540 B2 * | | 1/2011 | Cloutier ................ F25D 17/06 |
| | | | 62/381 |
| 7,870,748 B2 * | | 1/2011 | Byrne ...................... B01L 9/06 |
| | | | 62/62 |
| 8,037,833 B2 * | | 10/2011 | Hardy ...................... B62B 1/26 |
| | | | 211/133.1 |
| 9,140,482 B2 * | | 9/2015 | Popovitch ............ F25D 25/028 |
| 9,297,499 B2 * | | 3/2016 | Jimenez-Rios ........... F25D 3/10 |
| 9,385,574 B1 * | | 7/2016 | Xu .......................... F03G 6/005 |
| 9,463,396 B1 * | | 10/2016 | Geraets .............. F28D 20/0034 |
| 9,518,898 B2 * | | 12/2016 | Jimenez-Rios ........ C12M 45/22 |
| 9,587,873 B2 * | | 3/2017 | Berchowitz ............... F25B 9/14 |
| 10,900,700 B2 * | | 1/2021 | Garrabrant .............. F25B 15/04 |
| 10,973,226 B2 * | | 4/2021 | Blair ......................... B01L 9/06 |
| 11,473,817 B2 * | | 10/2022 | Zhou ...................... F25B 15/02 |
| 2002/0072112 A1 * | | 6/2002 | Atwood ............. G05D 23/1917 |
| | | | 435/303.1 |
| 2009/0305224 A1 * | | 12/2009 | He ....................... A01N 1/0278 |
| | | | 435/2 |
| 2012/0090160 A1 | | 4/2012 | Shaham et al. |
| 2013/0091890 A1 | | 4/2013 | Schryver et al. |
| 2013/0111931 A1 * | | 5/2013 | Grinter ................ A01N 1/0257 |
| | | | 62/62 |
| 2014/0165645 A1 | | 6/2014 | Schryver |
| 2014/0335614 A1 | | 11/2014 | Schryver |
| 2019/0059862 A1 * | | 2/2019 | Erhardt ................ A01N 1/0263 |
| 2020/0329700 A1 * | | 10/2020 | Morris ................. A01N 1/0284 |
| 2022/0136757 A1 * | | 5/2022 | Silvestre Duarte ..... F25D 17/06 |
| | | | 435/1.3 |

FOREIGN PATENT DOCUMENTS

| | | | |
|---|---|---|---|
| CN | 206629858 U | 11/2017 | |
| WO | 91/01635 A2 | 2/1991 | |
| WO | 2016148254 A1 | 9/2016 | |
| WO | 2016/178635 A1 | 11/2016 | |
| WO | 2017153009 A1 | 9/2017 | |
| WO | 2018/104935 A1 | 6/2018 | |
| WO | 2020100028 A1 | 5/2020 | |
| WO | WO-2020174338 A1 * | 9/2020 | ........... A01N 1/0242 |

OTHER PUBLICATIONS

GB Search Report for GB Application No. 1721824.9 mailed Sep. 3, 2018 (4 pages).

BioCision LLC: "CoolRack Thermo-Conductive Tube Modules", Jan. 1, 2014 (Jan. 1, 2014), XP055574378, Retrieved from the Internet: URL:http://www.biocision.com/uploads/docs/ lit CoolRack 20001 revA.pdf [retrieved on Mar. 26, 2019] the whole document.

Office Action Issued in Japanese Patent Application No. 2020-534388, mailed Nov. 28, 2022 with English Summary (9 pages).

Office Action Issued in European Patent Application No. 18829839.2, dated Aug. 27, 2024 (15 pages).

Isobel Massie et al: "GMP Cryopreservation of Large Volumes of Cells for Regenerative Medicine: Active Control of the Freezing Process", Tissue Engineering. Part C, Methods Dec. 2008, vol. 20, No. 9, Sep. 1, 2014 (Sep. 1, 2014), pp. 693-702, XP055575843.

* cited by examiner

APPARATUS AND METHODS RELATING TO FREEZING AT LEAST PART OF A BIOLOGICAL SAMPLE

CROSS REFERENCE TO RELATED APPLICATIONS

This application claims the priority benefit of PCT/EP2018/086163 filed on Dec. 20, 2018, which claims priority to Great Britain Patent Application No. 1721824.9 filed Dec. 22, 2017, the entire contents of which are hereby incorporated by reference herein.

BACKGROUND

Freezing techniques may be used to preserve biological material. There are different ways to freeze biological materials in order to preserve them. For example, freeze drying (lyophilisation) is a process in which a biological sample is frozen and, following the freezing step, water is removed from the sample, such that the sample is stored in a dried state. Cryopreservation is another method of freezing biological samples. Cryopreservation is a process in which biological material is frozen and then stored in a frozen state. Cryopreservation is a technique used to maintain long-term viability of biological samples for subsequent application in medicine, biotechnology and veterinary sciences. It may be important that the biological material is preserved in such a way that damage to, or degradation of, the biological material is minimised. For example, human oocytes or fertilised embryos may be cryopreserved as part of an in vitro fertilisation (IVF) process, where maintaining cell viability is an important consideration.

Cryopreservation involves cooling samples to, and potentially maintaining them for prolonged periods at, low temperatures, typically −196 degrees Celsius (° C.) (the boiling point of liquid nitrogen). By cooling a biological sample to −196° C. the kinetics of chemical and/or enzymatic reactions that would otherwise degrade the sample are slowed to such an extent that the sample no longer degrades. Thus, biological samples can be stored over prolonged periods and then brought back to ambient temperature as required.

Cryopreservation is particularly useful in cell and gene therapies, especially immunotherapies. A cold chain, for example a temperature-controlled supply chain comprising a series of stages relating to production, distribution and storage of cryopreserved biological samples, may be used in an effective clinical delivery of these therapies. During such a cold chain, an initial biological sample comprising cells extracted from a patient may be frozen to allow shipment to a so-called manufacturing centre. At the manufacturing centre, the cells may be thawed and manufactured, for example by culturing the cells to increase cell population and/or by treating the cells. The manufactured cells may then be cryopreserved for transport to a clinical delivery centre such as a hospital, where the manufactured cells may be thawed and delivered to the patient.

Cell viability, indicated by the likelihood of cell survival and/or function after thawing, may depend on various factors of the freezing process, some of which may be highly variable and/or difficult to predict. It is desirable to improve cell viability during the freezing process.

DETAILED DESCRIPTION

The apparatus and methods presented herein improve control of ice formation during freezing of biological samples, compared with known techniques. In examples, a device is provided comprising a base and a receptacle holder, the receptacle holder comprising at least two parts each configured to withdraw heat energy from a different region of the sample at a different heat withdrawal rate. The different heat withdrawal rates allow a temperature gradient to be established within the sample during the freezing process such that ice nucleation occurs in one region of the sample without ice nucleation in a second region of the sample. As such, an extent of undercooling in the sample may be reduced, thereby increasing cell viability. The apparatus and methods presented in examples herein enable ice formation to be controlled in a repeatable and flexible manner. Controlling ice formation according to the apparatuses and methods presented in examples herein facilitates an improved control of the freezing process.

Specific details will be described in the following description, in accordance with certain examples of the apparatus and methods, to explain and expand on specific features thereof.

Ice formation is an important consideration in the freezing of biological samples. As a temperature in the sample descends below the equilibrium melting point of the sample, ice nucleation may occur (around so-called ice nucleus particles), followed by growth of ice crystals throughout the sample. As ice formation proceeds, biological material such as cells may concentrate in solute-dense channels between the ice crystals. Such channels may then solidify, for example (e.g.) through vitrification.

During freezing of relatively small samples, for example samples stored in cryovials, the whole sample if cooled uniformly may undercool to a temperature substantially below the equilibrium melting point of the sample. Undercooling, or supercooling or subcooling, refers to the process of lowering the temperature of a fluid beyond its melting point without the fluid solidifying. Some samples may be undercooled to more than 10° C. below the melting point of the sample. An extent of undercooling may vary with sample volume. In particular, smaller volumes may undercool to a greater extent than larger volumes. When ice nucleates in an undercooled sample, the temperature in the sample may increase to near the melting point of the sample due to energy released from the latent heat of crystallisation. The temperature may then decrease rapidly, e.g. at a much faster rate than desired, which may impact cell viability upon thawing. Viability and/or function after thawing may be dependent on the type of cell undergoing the freezing/thawing process.

Figure 1:
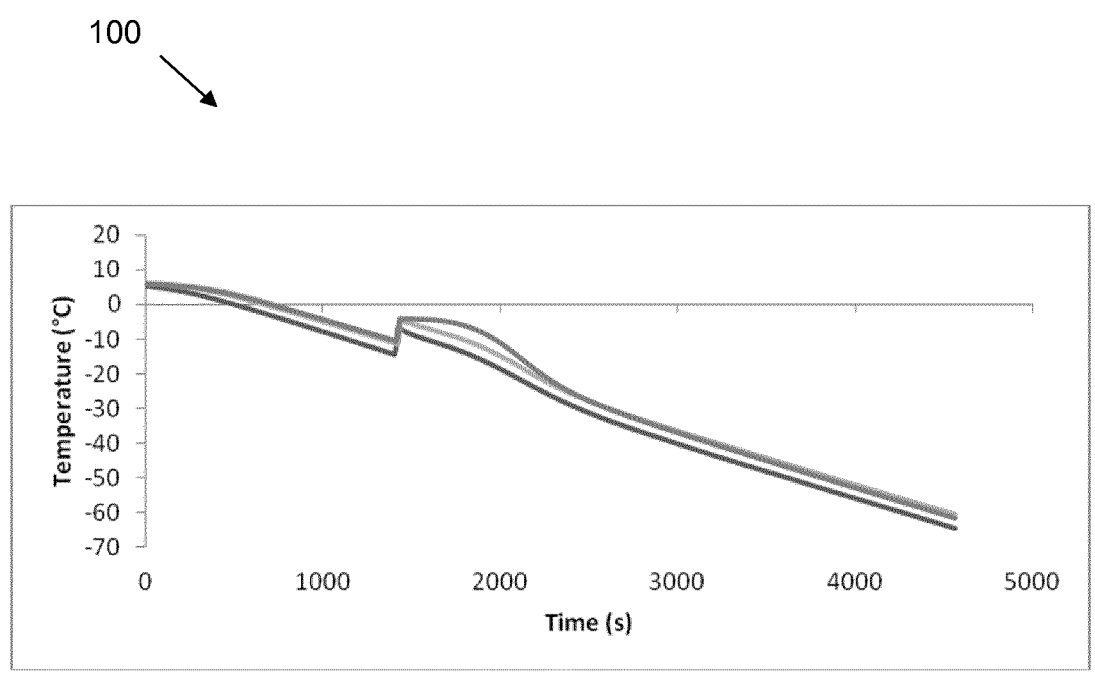
FIG. 1 shows a representation of an example data series of temperature values and corresponding time values.

FIG. 1 shows a representation 100 of an example data series of temperature values in a sample versus time during a freezing operation performed on the sample. Each of the three lines in the representation 100 corresponds to measured temperature data obtained by a thermocouple placed at a different location in the sample. In the example of FIG. 1, the entire sample undercools to between −15° C. and −10° C., until ice nucleation occurs at approximately 1500 seconds (s), causing a rapid jump in temperature throughout the sample. In the example of FIG. 1, the sample does not contain biological cells, although the presence of cells in a solution does not influence the nucleation behaviour in such a solution.

Following ice nucleation in one or more regions of an undercooled sample, a dendritic network of ice crystals coexists with a continuous phase of freeze concentrated material in which solutes and cells may be distributed. Ice nucleation may be spontaneous. Spontaneous nucleation may be a stochastic event and thus inherently difficult to control. For example, the temperature at which ice nucleation spontaneously occurs may vary between different samples. The structure of the ice network formed at nucleation and the corresponding freeze concentrated matrix may be dependent on the temperature at which nucleation occurs.

Alternatively, ice nucleation may be induced or triggered, in a process known as facilitated ice nucleation. Facilitated ice nucleation, or heterogeneous ice nucleation, may occur at temperatures that are higher than those at which homogeneous nucleation occurs, e.g. closer to the melting point of the sample. Facilitated ice nucleation may involve the use of a nucleation trigger. Examples of nucleation triggers include: generation of a cold spot on the outside of the cryocontainer; introduction of chemical ice nucleating catalysts into the sample; and the application of ultrasound. However, known methods of inducing ice nucleation may have shortcomings. For example, known methods may require user interference, use chemical nucleants which are not biocompatible, may not be repeatable in a standardised manner, or more may be prohibitively expensive and/or complicated to implement.

The devices, receptacles and methods presented in examples herein allow ice formation to be controlled in a repeatable and flexible manner during a freezing operation. Progressive solidification, which may otherwise be referred to as directional solidification, is used to control ice formation and reduce an extent of undercooling of samples. Progressive solidification refers to a process of causing a sample to solidify progressively, typically along an axis. For example, solidification may start in one region of a sample and proceed, along the axis, through the sample towards a second region of the sample. In progressive solidification, ice nucleation may be restricted to the region of the sample in which solidification commences, e.g. the first region. Progressive solidification may be implemented by establishing a temperature gradient within a sample, e.g. between a first, colder region and a second, warmer region, and allowing the sample to progressively solidify along the axis of the temperature gradient from the colder region to the warmer region. Reducing undercooling may increase a likelihood of cell survival after thawing of the sample, and controlling the incidence and/or location of ice nucleation in a standardised way may allow for a reduction in the stochastic variability of freezing procedures.

A device is provided herein in examples for use in freezing at least part of a biological sample in a receptacle. The device comprises a base and a receptacle holder. The base and the receptacle holder may be integrally formed or may be separate bodies. The receptacle holder is configured to hold one or more receptacles, containers, cryocontainers or the like. The base is configured to be cooled by a cooler device. The cooler device may be part of a cryocooler such as a Sterling cryocooler, although other examples of cooler devices that may be used are described below. The base of the device may be contactable by a cooling surface. Such a cooling surface may be part of a heat sink. A heat sink may absorb or withdraw heat energy from a sample during a cooling operation performed on the sample. As such, the base of the device may be cooled by conduction via the cooling surface.

The receptacle holder comprises a first part configured to, with a receptacle held by the receptacle holder during cooling of the base using the cooler device, withdraw heat energy from a first portion of the receptacle at a first heat withdrawal rate. As such, heat energy may be withdrawn from a first region of a sample via the first part of the receptacle holder, the first region of the sample being in contact with the first portion of the receptacle. In examples, the first portion of the receptacle is placed in conductive contact with the first part of the receptacle holder to allow heat energy to be withdrawn via the first part of the receptacle holder. In examples, the first part is configured to at least partially surround the first portion of the receptacle.

The receptacle holder also comprises a second part configured such that, with the receptacle held by the receptacle holder during cooling of the base using the cooler device, a second heat withdrawal rate of heat energy withdrawal from a second portion of the receptacle via the second part is less than the first heat withdrawal rate. As such, a second region of the sample may lose heat energy via the second part of the receptacle holder at a lower rate than a rate at which the first region of the sample loses heat via the first part of the receptacle holder, the second region of the sample being in contact with the second portion of the receptacle. In some examples, the second portion of the receptacle is placed in conductive contact with the second part of the receptacle holder. In other examples, the second portion of the receptacle is not placed in conductive contact with the second part of the receptacle holder. For example, the second portion of the receptacle may be spaced apart with respect to the second part of the receptacle holder. In examples, the second part is configured to at least partially surround the second portion of the receptacle.

In some examples, the first part of the receptacle holder is closer to the base than the second part of the receptacle holder. In other words, the second part may be further from the base than the first part. Therefore, the device may be configured to withdraw heat from the sample at a higher rate closer to the base of the device and at a lower rate further from the base of the device.

In some examples, the second part of the receptacle holder is configured to withdraw heat energy from the second portion of the receptacle at the second heat withdrawal rate. In other words, the second part of the receptacle holder may actively withdraw heat from the second portion of the receptacle. In some cases, the second part of the receptacle holder is configured to reduce, inhibit or prevent heat loss from the second portion of the receptacle.

In some examples, the first part of the receptacle holder comprises a first material having a first value of a heat flow characteristic and the second part of the receptacle holder comprises a second material having a second, different value of the heat flow characteristic. The heat flow characteristic may be considered as a heat transfer characteristic, heat withdrawal characteristic, cooling rate characteristic or the like. The heat flow characteristic of a given receptacle holder part may in some examples be considered a characteristic or parameter of the material of which the given receptacle holder part is comprised, which influences a flow of heat energy from a portion of the receptacle to the given receptacle holder part. The heat flow characteristic of a given receptacle holder part may determine the heat withdrawal rate from the receptacle via that given receptacle holder part.

A difference between the first heat withdrawal rate and the second heat withdrawal rate may be at least sufficient to establish a temperature gradient within a sample in the receptacle such that, during a freezing operation using the cooler device, ice nucleation occurs in the first region of the sample, without ice nucleation in the second region of the sample. In some examples, the first and second heat withdrawal rates are determined and/or configured based on a desired temperature gradient within the sample, where the desired temperature gradient is to restrict ice nucleation in the sample to the first region of the sample and/or prevent ice nucleation in the second region of the sample. The temperature gradient may have an axis substantially perpendicular to the base of the device.

In some examples, a difference between the first heat withdrawal rate and the second heat withdrawal rate is such that, for a sample having a volume of 5 millilitres (ml), a temperature difference between a first region of the sample in contact with the first portion of the receptacle and a second region of the sample in contact with the second portion of the receptacle during cooling of the base is at least 15° C.

Inducing ice nucleation in the first region of the sample and preventing ice nucleation in the second region of the sample may reduce an exposure of biological material, e.g. cells, to sudden thermal changes associated with nucleation. For example, only cells in the first region may be exposed to such thermal changes. Therefore, cell viability in a sample may be increased compared to a case in which ice nucleation is allowed to occur throughout the sample.

Further, nucleation in the first region may be induced without user intervention or a separate, manual nucleation step, which may involve, for example, touching an outer surface of the receptacle with cold forceps to generate a cold spot on the outer surface. A repeatability of the freezing process may therefore be enhanced. In examples described herein, inducement of ice nucleation may be performed by the receptacle holder itself as part of the cooling process, e.g. by cooling of the receptacle holder whilst at least a part of the receptacle holder is in contact with the receptacle. The receptacle holder may therefore perform both cooling of the sample and triggering of ice nucleation, without the need for separate nucleation trigger means. As such, there may be no need for chemical catalysts to be added to the sample to induce nucleation, where such chemical catalysts may not be biocompatible and/or may require an extra step of washing the biological material after thawing to remove the chemical catalysts. The measures provided herein may also be less complex than systems in which ice nucleation is induced using a separate ice nucleation means.

Moreover, the first receptacle part and the second receptacle part may each have heat transfer characteristics which can be individually optimised or tuned. For example, the material and/or geometric properties of both the first receptacle part and the second receptacle part may be optimised such that a desired temperature gradient within the sample is achieved. As such, multiple degrees of freedom are provided for modifying the heat flow characteristics from a sample to a receptacle holder during freezing of the sample. Different properties for the first and/or second receptacle parts may be used for different types of sample, different types of receptacle, different freezing modes, different types of cooling apparatus, or different sample volumes. A flexible and adaptable mechanism for optimising temperature gradients in biological samples and achieving directional solidification is therefore provided.

Examples of devices and features thereof will now be described in detail.

Figure 2:
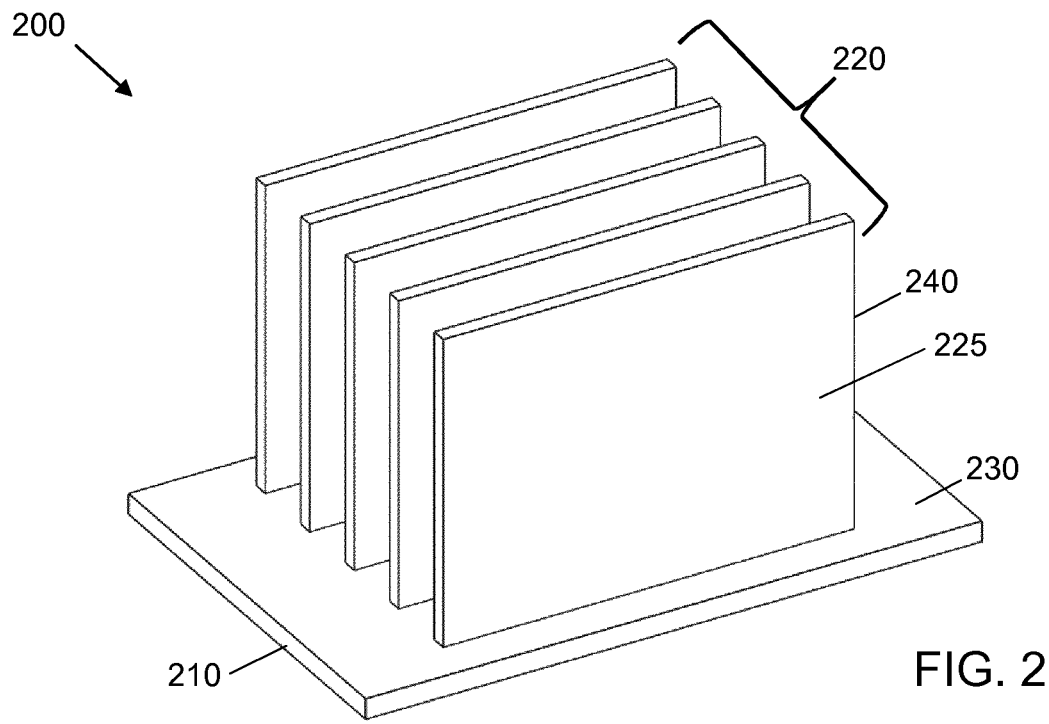
FIGS. 2 to 5 show schematically example devices.

FIG. 2 shows a device 200 according to examples for use in freezing at least part of a biological sample in a receptacle (not shown). In this example, the device 200 is for freezing biological samples in cryopreservation bags, or cryobags, it being understood that other types of receptacle can be used in other examples. A cryobag is for example a specialist flexible bag suitable for storing biological samples during cryopreservation. Cryobags may be configured to store relatively large sample volumes, e.g. between 5 millilitres (ml) and 1000 ml.

A sample may include a fluid or liquid, e.g. an aqueous solution, to be cooled or frozen. A biological sample may be considered a sample that contains biological material (or matter, substance, or media). Biological material may be considered material that is produced in, or present in, a living organism. Examples of biological material include, but are not limited to, cells, organelles, viruses, vaccines, organs, matrices, microorganisms and tissue. A sample may be contained within a container or receptacle, e.g. a cryocontainer or a cryobag. The receptacle may be a vessel, a test tube, a vial, a straw, or a bag in examples.

The device 200 comprises a base 210 and a plurality of walls 220 extending from the base 210. The base 210 may be considered a bottom or lower part of the device 200, a surface of which the device 200 may rest upon. For example, with the device resting on its base, a non-bag type receptacle held by the device and holding a sample may be oriented in an upright position. The base 210 may have a generally planar shape, for example if it is a plate. The base may have a planar surface, for example on which the device may rest. The base 210 may be mounted on or otherwise contacted by a cooler device, e.g. a cryocooler, for example via a planar surface of the base. The plurality of walls 220 includes a wall 225. The device 200 may be configured to hold or retain a plurality of receptacles, e.g. cryobags, each receptacle being placed substantially upright between a pair of walls. As such, the device 200 may be considered to comprise a receptacle holder. The walls 220 may be substantially perpendicular (within acceptable measuring tolerances) to the base 210 or angled by a non-perpendicular angle with respect to the base 210. In this example, the walls 220 are substantially parallel (for example within acceptable measuring tolerances) with respect to each other. In other examples, the walls 220 may be non-parallel with respect to each other.

In this example, the base 210 comprises a plate. The plate 210 may comprise a heat conductive plate. The plate 210, or panel, may act as a heat sink. The plate 210 may be cooled by a cooler device such as a cryocooler. In some examples, the plate 210 is part of a cryocooler. In this example, a first receptacle holder part 230 of the device 200 is part of a surface of the plate 210. The surface may be an upper surface of the plate 210. The surface may be a heat conductive surface. The first receptacle holder part 230 is configured to withdraw heat energy from a first portion of a receptacle at a first heat withdrawal rate, when the base 210 is cooled by a cooler device. In this example, the first receptacle holder part 230 is configured to contact the lowermost portion of the receptacle, e.g. the base of the receptacle, during cooling of the sample.

In this example, a second receptacle holder part 240 is part of the wall 225 extending from the plate 210, e.g. one of the plurality of walls 220. In some examples, the second receptacle holder part 240 is the entirety of the wall 225. In some examples, the second receptacle holder part 240 includes part of multiple walls in the plurality of walls 220. The second receptacle holder part 240 is configured such that a second heat withdrawal rate of heat energy withdrawal from a second portion of the receptacle via the second receptacle holder part 240 is lower than the first heat withdrawal rate. For example, with a receptacle standing substantially upright between a pair of walls, heat may be transferred to one or both of the pair of walls from the receptacle at a lower rate than the rate at which heat is transferred from the base of the receptacle to the upper surface of place 210.

The second receptacle holder part 240 may have a different heat flow characteristic than the first receptacle holder part 230. For example, the first and second receptacle holder parts may comprise materials having different thermal conductivities. The difference between the heat flow characteristics of the first and second receptacle holder parts allows a temperature gradient to be established in the sample during cooling of the sample that is sufficient to induce ice nucleation in a first region of the sample that is in contact with the first portion of the receptacle, but not in a second region of the sample that is in contact with the second portion of the sample.

Figure 3:
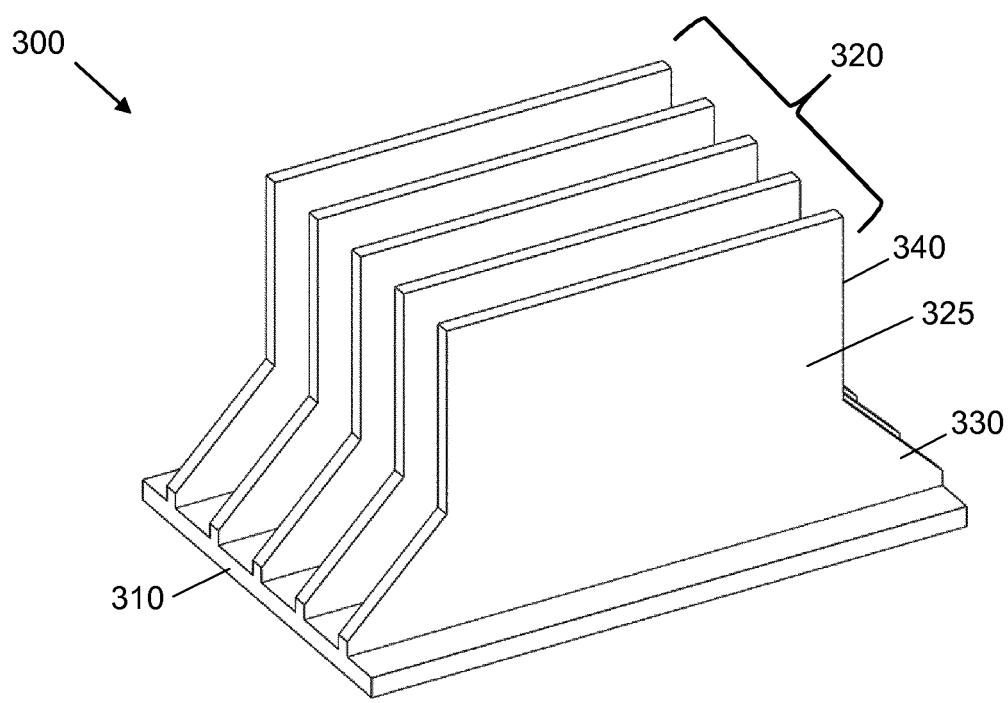

FIG. 3 shows an example device 300 for use in freezing at least part of a biological sample in a receptacle (not shown). Some items depicted in FIG. 3 are similar to items shown in FIG. 2. Corresponding reference signs, incremented by 100, are therefore used for similar items, and corresponding descriptions should be taken to apply also.

In this example, a base portion of the wall 325 is wider than a non-base portion of the wall 325, the base portion of the wall 325 being closer to the base 310 than the non-base portion of the wall 325. In this example, the first part of the receptacle holder 330 is a first wall part of the wall 325, e.g. the base portion of the wall 325, and the second part of the receptacle holder 340 is a second wall part of the wall 325, e.g. the non-base portion of the wall 325. The first part of the receptacle holder 330 may additionally include the upper surface of the plate 310 in some examples.

Since the base portion of the wall 325 is wider than the non-base portion of the wall 325, a contact area between the base portion of the wall 325 and a receptacle held by the device 300 may be greater than a contact area between the non-base portion of the wall 325 and the receptacle. The size of the contact area between a given receptacle holder part and the receptacle is an example of a heat transfer characteristic of the given receptacle holder part. The relatively small contact area between the non-base portion of the wall 325 and the receptacle allows a relatively low rate of heat transference from the receptacle via the non-base portion of the wall 325 during cooling of the base 310, compared with the rate of heat transference from the receptacle via the base portion of the wall 325. As such, a temperature gradient may be established in the sample to enable progressive solidification to occur in the sample. The relative widths of the different portions of the wall 325 may be adapted and/or optimised in order to control or modify a temperature gradient for different sample types, volumes, or cooling rates.

In this example, each of the plurality of walls 320 has a relatively wide base portion and a relatively narrow non-base portion. In some examples, one or more of the plurality of walls 320 have a varying width as they extend from the base 310 and one or more others of the plurality of walls 320 do not have a varying width as they extend from the base 310.

Figure 4:
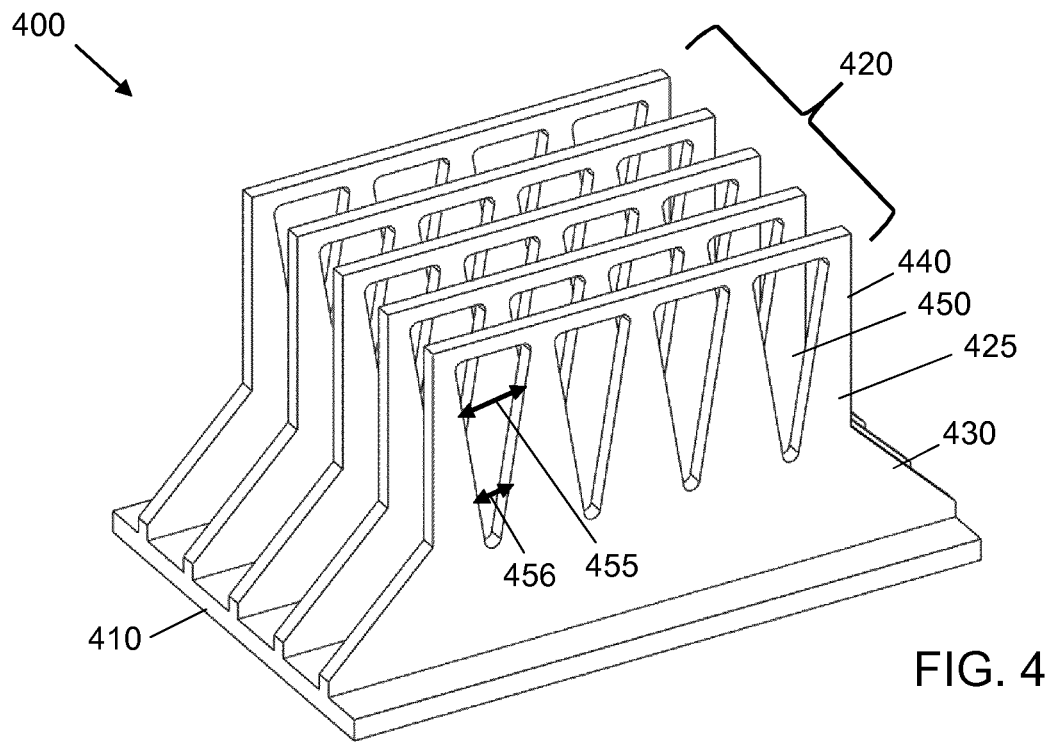

FIG. 4 shows an example device 400 for use in freezing at least part of a biological sample in a receptacle (not shown). Some items depicted in FIG. 4 are similar to items shown in FIG. 3. Corresponding reference signs, incremented by 100, are therefore used for similar items, and corresponding descriptions should be taken to apply also.

In this example, the wall 425 comprises an opening 450 through the wall 425. The opening 450, or hole, may be produced by cutting out a portion of the wall 425, for example. A first width 456 of the opening 450 is narrower than a second width 455 of the opening 450, the first width 456 closer to the base 410 than the second width 455. As such, the width of the opening 450 may vary along an axis perpendicular to the base 410. When a receptacle is placed between the wall 425 and an adjacent wall of the plurality of walls 420, there may be a relatively low contact area between the wall 425 and the receptacle where the opening 450 has the second width 456, compared to the contact area between the wall 425 and the receptacle where the opening 450 has the first width 456. As such, a lower rate of heat transference from the receptacle to the region of the wall 425 having the second width 455 of the opening 450 may be established compared to a rate of heat transference from the receptacle to the region of the wall 425 having the first width 456 of the opening 450. The varying width of the opening 450 along a height of the wall 425 may facilitate the establishment of a temperature gradient in the sample sufficient to achieve progressive solidification of the sample. The relative widths of the opening 450 in different portions of the wall 325 may be adapted and/or optimised in order to control or modify a temperature gradient for different sample types, volumes, or cooling rates.

In this example, the wall 425 comprises a relatively wide base portion and a relative narrow non-base portion, where only the non-base portion comprises the opening 450. In other examples, both the base portion and the non-base portion may comprise openings, which may be similarly or differently sized.

Although in this example the wall 425 comprises a relatively wide base portion and a relatively narrow non-base portion with respect to the base portion, in other examples walls may be used that have base and non-base portions of similar or the same width, where the non-base portion may comprise a wider opening than that of the base portion, or where only the non-base portion comprises an opening.

Figure 5:
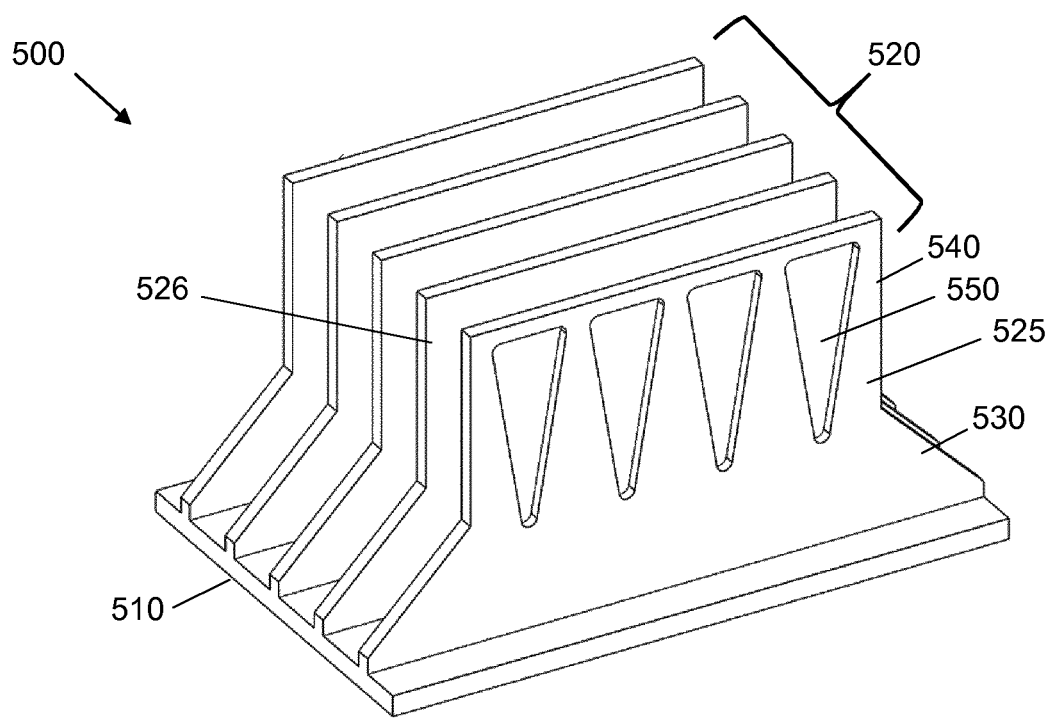

FIG. 5 shows an example device 500 for use in freezing at least part of a biological sample in a receptacle (not shown). Some items depicted in FIG. 5 are similar to items shown in FIG. 4. Corresponding reference signs, incremented by 100, are therefore used for similar items, and corresponding descriptions should be taken to apply also.

In this example, a first wall 525 comprises an opening 550, such as that described with reference to FIG. 4 above, and a second wall 526 does not comprise an opening. As such, a contact area between the first wall 525 and a receptacle may be smaller than a contact area between the second wall 526 and the receptacle, due to the presence of the opening 550 in the first wall 525 and an absence of an opening in the second wall 526. A first width of the opening 550 in the first wall 525 is greater than a second width of the opening 550, the first width further from the base 510 than the second width.

The first wall 525 and the second wall 526 may be adjacent walls in the plurality of walls 520. As such, a given receptacle when held by the device 500 may be placed in contact with both the first wall 525 and the second wall 526. In such a case, there may be a greater rate of heat energy withdrawal from the receptacle via the second wall 526 than that from the receptacle via the first wall 525, due to the presence of the opening 550 in the first wall 525.

In some examples, the second wall 526 also comprises an opening. The opening in the second wall 526 may be differently sized and/or shaped than the opening 550 in the first wall 525.

The inclusion of openings, or holes, in one or both of a pair of adjacent walls provides an additional degree of freedom for optimising the temperature gradient in a sample during freezing of the sample. The presence, position, size and shape of openings, as well as whether such openings are present on one or both of the pair of walls between which the receptacle is to be received, are all parameters which may be separately optimisable. For example, different types and sizes of openings may be provided for different sample types and/or volumes, in order to achieve progressive solidification of samples in a repeatable and flexible manner.

Figure 6:
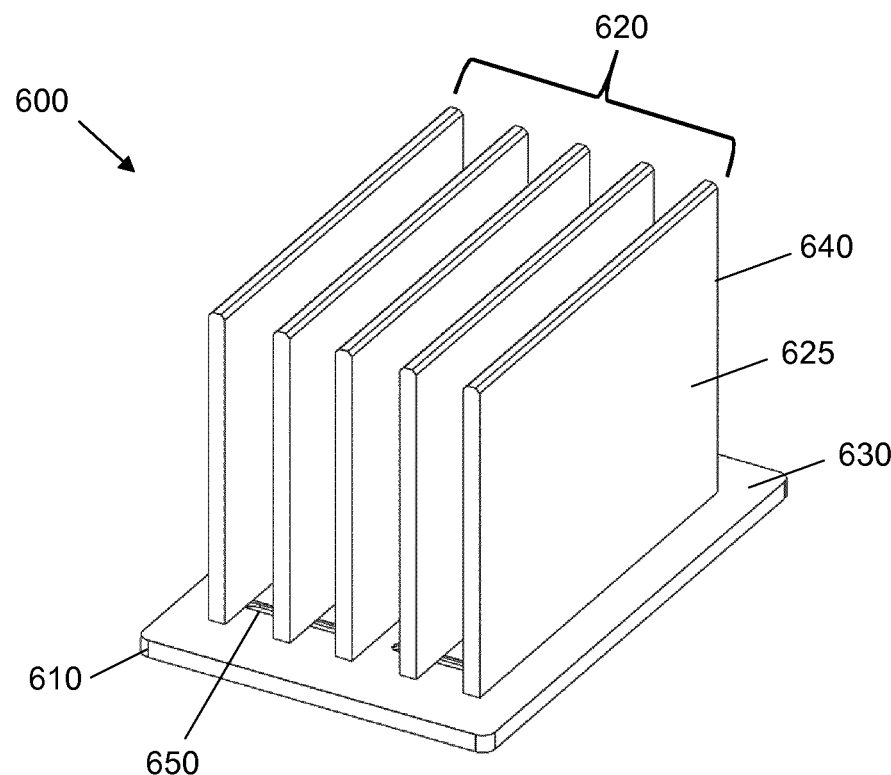
FIGS. 6 and 7 show schematically an example device viewed from a first and second perspective.
Figure 7:
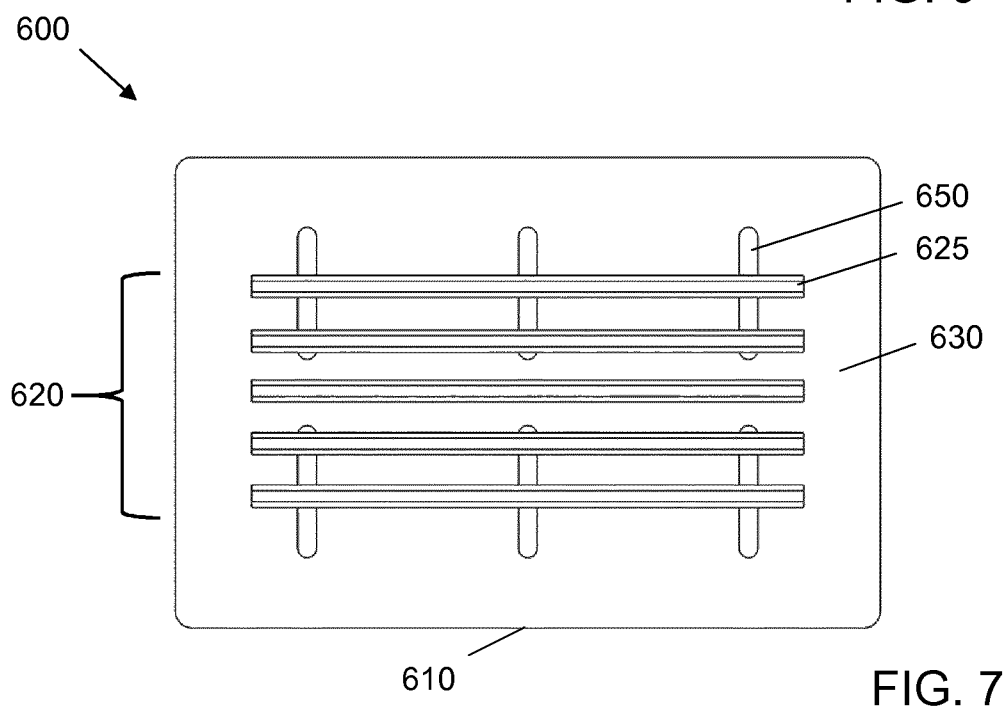

FIGS. 6 and 7 show an example device 600 for use in freezing at least part of a biological sample in a receptacle (not shown). Some items depicted in FIGS. 6 and 7 are similar to items shown in FIG. 2. Corresponding reference signs, incremented by 400, are therefore used for similar items, and corresponding descriptions should be taken to apply also.

In the example shown in FIGS. 6 and 7, the device 600 comprises a slot 650, or track. The slot 650 is part of the base 610 of the device 600. The plurality of walls 620 may be slidably mounted on the base 610 via the slot 650. As such, the slot 650 enables the separation between adjacent walls in the plurality of walls 620 to be adjusted. Having slidably mounted walls may allow the device 600 to accommodate receptacles of different sizes, for example. Additionally or alternatively, the slidably mounted walls may ensure that the walls are in contact with the receptacle during the freezing operation. For example, the slidably mounted walls may be pressed securely against the sides of the receptacle to make thermal contact with the receptacle, and then pulled away from the sides of the receptacle after the freezing operation is completed.

Figure 8:
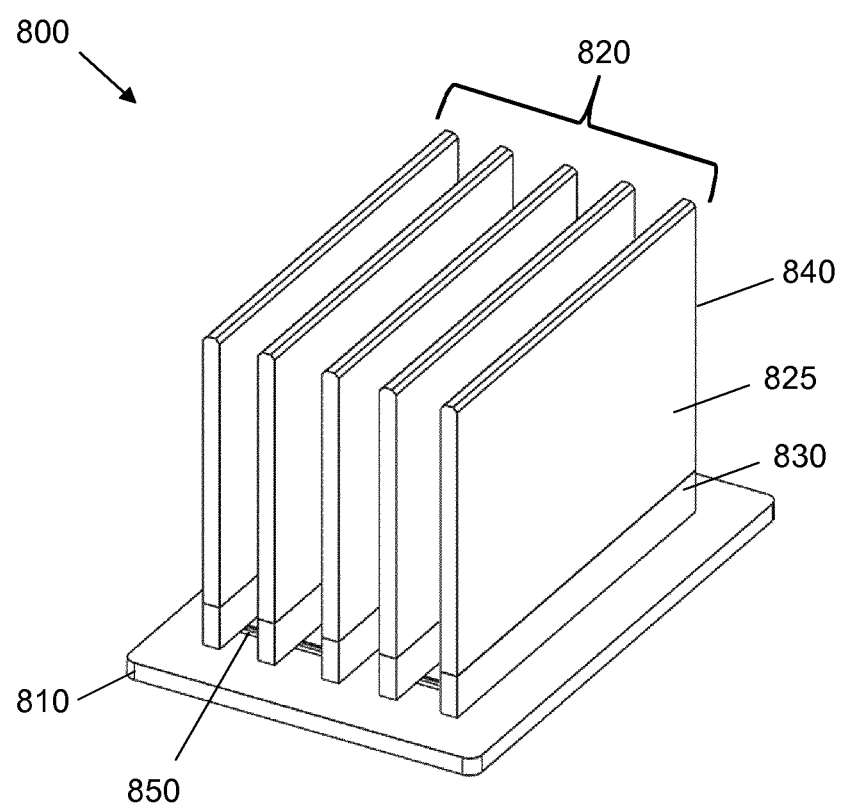
FIG. 8 shows schematically another example device.

FIG. 8 shows an example device 800 for use in freezing at least part of a biological sample in a receptacle (not shown). Some items depicted in FIG. 8 are similar to items shown in FIG. 6. Corresponding reference signs, incremented by 200, are therefore used for similar items, and corresponding descriptions should be taken to apply also.

In this example, the wall 825 comprises a base portion and a non-base portion. The first receptacle holder part 830 comprises the base portion of the wall 825. The second receptacle part 840 comprises the non-base portion of the wall 825. The first receptacle holder part 830 may additionally comprise an upper surface of the base 810.

In this example, the base portion of the wall 825 comprises a first material, or substance, and the non-base portion of the wall 825 comprises a second, different material. In some examples, the first material comprises a metal. For example, the first material may comprise aluminium, silver, copper or brass. In other examples, the first material comprises a non-metal. For example, the first material may comprise sapphire. The second material may comprise a polymer. For example, the second material may comprise polypropylene, polystyrene or polytetrafluoroethylene (PTFE). The first material may have a first thermal conductivity and the second material may have a second thermal conductivity. A thermal conductivity is for example a rate at which heat energy is transmitted through a particular material. In an example, the first thermal conductivity is at least 10 Watts per meter-Kelvin (W/mK). In an example, the second thermal conductivity is at most 1 W/mK. The first material and/or the second material may be selected such that a predetermined temperature gradient is established in the sample during a freezing operation. For example, the first material may be selected in order to achieve a first heat transfer rate from the sample to the base portion of the wall 825, and the second material may be selected in order to achieve a second, lower heat transfer rate from the sample to the non-base portion of the wall 825. The first and/or second materials may be chosen based on their heat conducting properties. Using different materials for the first and second receptacle holder parts 830, 840 provides an additional degree of freedom for optimising the temperature gradient in a sample during freezing of the sample. The materials, and material characteristics, of each of the receptacle holder parts 830, 840 may be separately optimisable. For example, one or both of the materials used for the first and second receptacle holder parts 830, 840 may be adapted or changed for different sample types, volumes, or cooling rates, in order to achieve progressive solidification of samples in a repeatable and flexible manner.

In some examples, the base 810 and the base portion of the wall 825 are comprised of the same material. For example, the first part of the receptacle holder 830 may include both the upper surface of the base 810 and the base portion of the wall 825. In some examples, the base 810 is comprised of a different material than that of the base portion of the wall 825.

In this example, the wall 825 is slidably mounted on the base 810 via slot 850. In other examples, the wall 825 is fixed to the base 810. In this example, the base portion of the wall 825 has the same width to the non-base portion of the wall 825, within acceptable manufacturing tolerances. In other examples, the base portion of the wall 825 is wider than the non-base portion of the wall 825, such that a contact area between the base portion of the wall 825 and the receptacle is greater than a contact area between the non-base portion of the wall 825 and the receptacle. In some examples, the base portion of the wall 825 and/or the non-base portion of the wall 825 comprise one or more openings, as described in more detail above.

Figure 9:
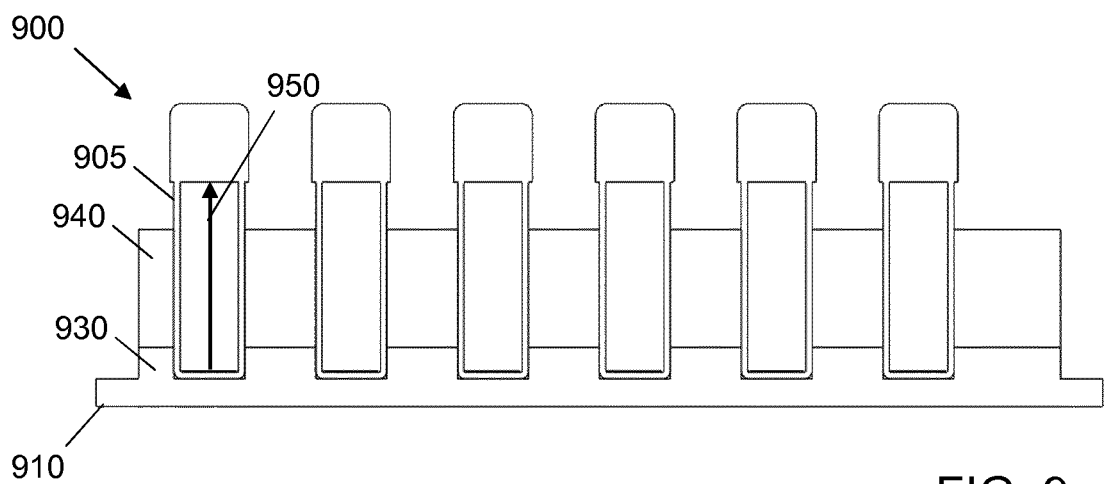
FIGS. 9 to 11 show schematically an example device viewed from a first, second and third perspective.
Figure 10:
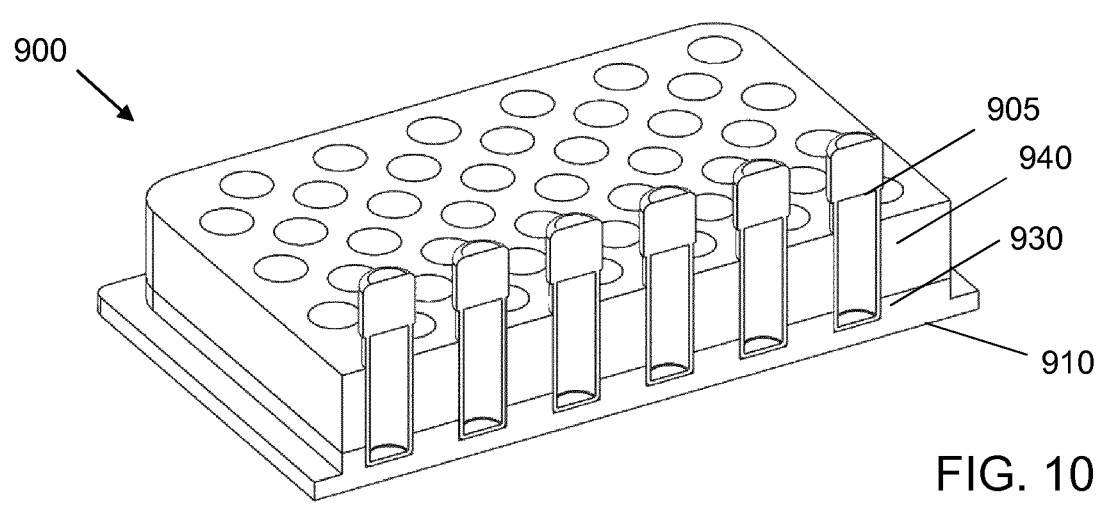
Figure 11:
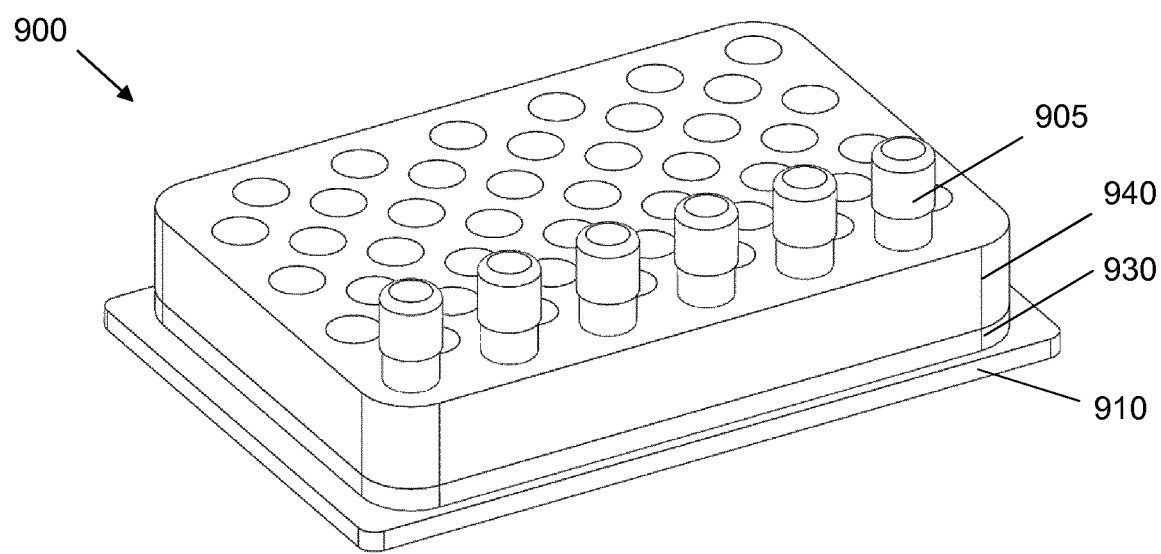

FIGS. 9 to 11 show a device 900 in accordance with examples for use in freezing at least part of a biological sample in a receptacle 905. In this example, the receptacle 905 comprises a cryovial, it being understood that other types of receptacle can be used in other examples. A cryovial may be a specialist tube or vial that is suitable for storing biological samples during cryopreservation. Cryovials may be configured to store relatively small sample volumes, e.g. between 0.5 and 50 ml.

The device 900 comprises a base 910. The base 910 is for example a bottom part of the device 900, configured to support the device 900 or on which the device 900 may rest. The base 910 may be contactable with a cooling surface of a cooler device such as a cryocooler or heat conductive plate. In this example, the device 900 comprises one or more receptacle holders for holding, respectively, one or more receptacles such as the receptacle 905. The receptacle holder may be considered part of a sample plate for freezing samples in vials. In other examples, the device comprises a single receptacle holder configured to hold only a single receptacle, e.g. the receptacle 905.

In this example, the receptacle holder comprises a recess to receive the receptacle 905. The recess, or cavity, may be produced by boring or drilling a hole into a solid plate. The recess may be configured to have similar dimensions, within acceptable measurement tolerances, to the receptacle which is to be placed therein, such that the walls of the receptacle are flush with the walls of the recess.

The receptacle holder comprises a first receptacle holder part 930 and a second receptacle holder part 940. The first receptacle holder part 930 may be considered a base portion and the second receptacle holder part 940 may be considered a non-base portion, since the first receptacle holder part 930 is closer than the second receptacle holder part 940 to the base 910. The first receptacle holder part 930 may be configured to contact a first portion of the receptacle 905, e.g. a lower portion of the receptacle 905. The second receptacle holder part 930 may be configured to contact or otherwise hold a second portion of the receptacle 905, e.g. an upper portion of the receptacle 905. In this example, the first receptacle holder part 930 extends partway up the walls of the recess in which the receptacle 905 is received. In some examples, the first receptacle holder part is part of the base upon which the receptacle stands, but is not part of the walls of the recess. In some other examples, the first receptacle holder part 930 includes part of the base 910 and part of the walls of the recess.

In this and other examples, the first receptacle holder part 930 is configured to at least partly surround the first portion of the receptacle 905 and the second receptacle holder part 940 is configured to at least partly surround the second portion of the receptacle 905. Surrounding a given portion of the receptacle may involve a surface of the respective receptacle holder part extending at least partly around the given portion of the receptacle, e.g. such that more than half of the surface of the given receptacle portion faces the surface of the respective receptacle holder part. The surface of the given receptacle portion may be in contact with the surrounding receptacle holder part or may be spaced apart from it, as described in examples below.

In this example, the first receptacle holder part 930 is comprised of a first material and the second receptacle holder part 940 is comprised of a second material, different from the first material. The first material may have a relatively high thermal conductivity compared to the second material, and the second material may have a relatively low thermal conductivity compared to the first material. The second receptacle holder part 940 may be comprised of a thermally insulating material.

In some examples, the first receptacle holder part 930 and the second receptacle holder part 940 have different porosities. For example, the second receptacle holder part 940 may be comprised of a material having a relatively high porosity compared to the material of the first receptacle holder part 930, and the first receptacle holder part 930 may be comprised of a material having a relatively low porosity compared to the material of the second receptacle holder part 940. The greater porosity of the second receptacle holder part 940 relative to the first receptacle holder part 930 may result in a lower thermal conductivity of the second receptacle holder part 940 relative to the first receptacle holder part 930. In some examples, the materials of the first receptacle holder part 930 and the second receptacle holder part 940 may differ only in their relative porosities. Although materials having different porosities are described in relation to the device 900, it will be understood that materials having different porosities may also be used in other examples devices, such as the device 800 described with reference to FIG. 8 above. In an example, the second receptacle holder part 940 may be comprised of a material with a hollow therein and the first receptacle holder part 930 may be comprised of a solid material. The material with the hollow may provide a layer of insulating gas, e.g. air in the hollow, within the second receptacle holder part 940, thereby reducing the effective thermal conductivity of the second receptacle holder part 940. Due to the different materials and/or material properties used, the first receptacle holder part 930 and the second receptacle holder part 940 have different heat transfer characteristics to enable heat energy to be withdrawn from the sample at different rates during a freezing operation.

The device 900 is configured to hold the receptacle 905 along a freezing operation temperature gradient axis 950 extending away from the base 910. The temperature gradient axis 950 may be substantially perpendicular (within acceptable measurement tolerances) to the plane of the base 910 in some examples. The temperature gradient axis 950 may define a direction in which the sample progressively solidifies during a freezing operation. For example, solidification may commence in a base region of the sample and proceed upwards towards an upper region of the sample. The base region of the sample may be the region in which ice nucleation occurs, and the region to which ice nucleation is restricted. The temperature gradient in the sample having temperature gradient axis 950 may be implemented via the different heat withdrawal rates of the first and second receptacle holder parts 930, 940. Although the temperature gradient axis 950 is shown in FIGS. 9 to 11, it will be understood that temperature gradients having temperature gradient axes may also be implemented in the other examples described herein.

Figure 12:
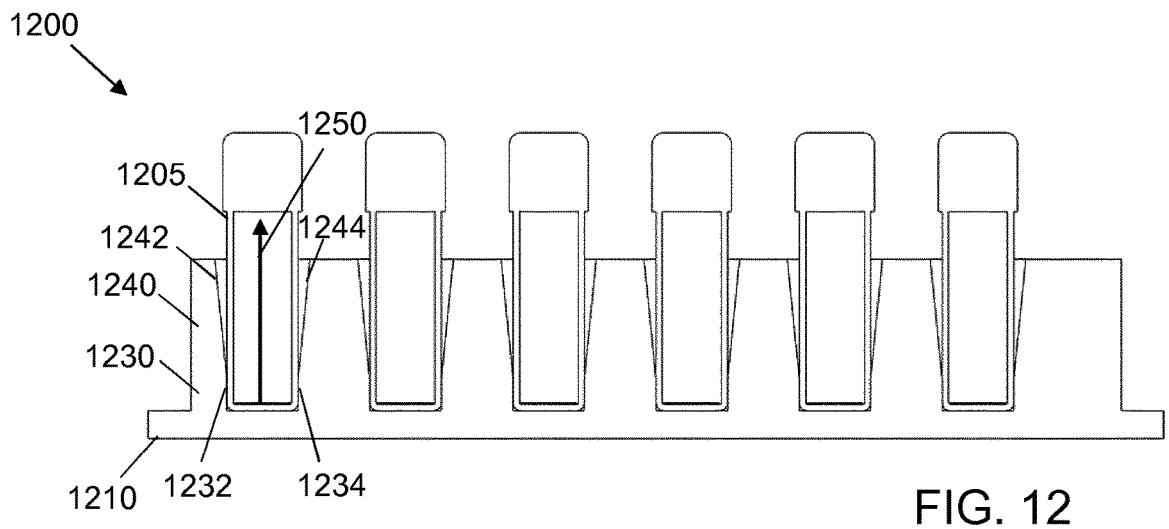
FIGS. 12 to 14 show schematically another example device viewed from a first, second and third perspective.
Figure 13:
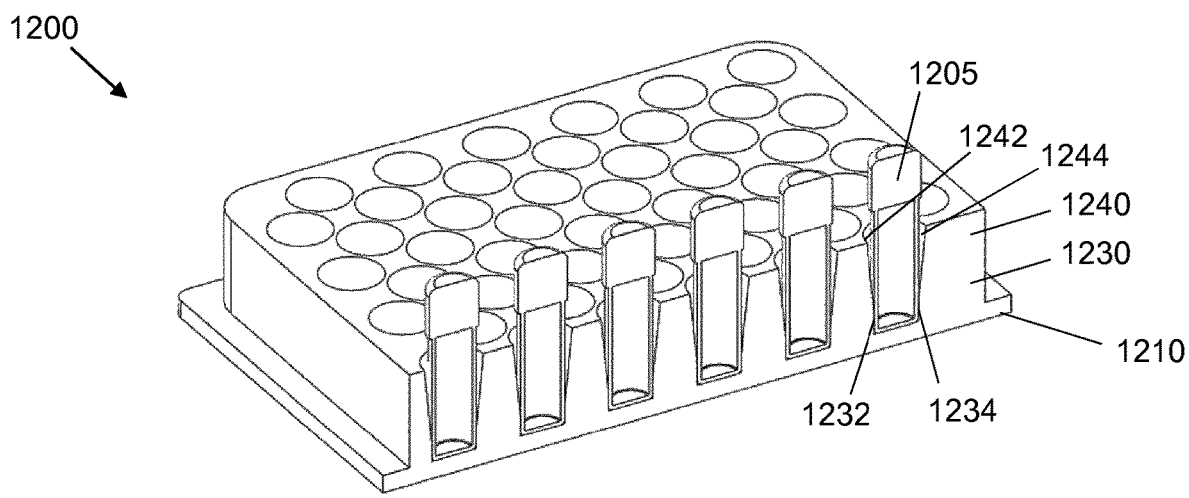
Figure 14:
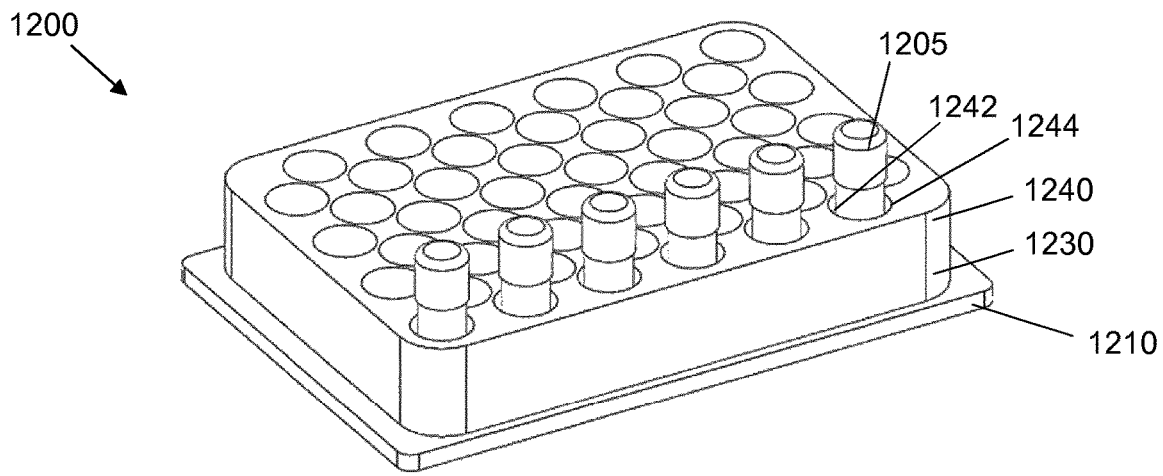

FIGS. 12 to 14 show an example device 1200 for use in freezing at least part of a biological sample in a receptacle 1205. In this example, the receptacle 1205 comprises a cryovial. Some items depicted in FIGS. 12 to 14 are similar to items shown in FIGS. 9 to 11. Corresponding reference signs, incremented by 300, are therefore used for similar items, and corresponding descriptions should be taken to apply also.

The receptacle holder comprises a first receptacle holder part 1230 and a second receptacle holder part 1240. The receptacle holder is configured to hold the receptacle 1205 along a freezing operation temperature gradient axis 1250 extending away from the base 1210. The temperature gradient axis 1250 may be substantially perpendicular to the plane of the base 1210 in some examples, e.g. within an acceptable measurement tolerance. The first receptacle holder part 1230 comprises a first surface 1232. The second receptacle holder part 1240 comprises a second surface 1242. The first and second surfaces 1232, 1242 may be inner surfaces of the recess. The first surface 1232 may abut the receptacle 1205 when the receptacle 1205 is received by the device 1200. The second surface 1242 is further from the base 1210 than the first surface 1232. In this example, the second surface 1242 is further from the temperature gradient axis than the first surface 1232. In this example, the second surface 1242 does not abut the receptacle 1205 when the receptacle 1205 is received by the device 1200. The second surface 1242 is therefore spaced from the receptacle 1205 by a predetermined amount when the receptacle 1205 is received by the device 1200. In some examples, the first surface 1232 is substantially parallel to the temperature gradient axis 1250, e.g. within an acceptable tolerance. In some examples, the second surface 1242 is angled with respect to the temperature gradient axis 1250 by a non-parallel angle, though in other examples, the second surface 1242 is substantially parallel (within acceptable measurement tolerances) to the temperature gradient axis 1250.

As such, with the receptacle 1205 held by the receptacle holder, a first volume of ambient gas between the first surface 1232 and a first portion of the receptacle 1205 may be less than a second volume of ambient gas between the second surface 1242 and a second portion of the receptacle 1205. Typically, an ambient gas is a gaseous medium surrounding the receptacle, which may be air or another gas or gas mixture. During a cooling operation, for example cooling of the base 1210 with a cooler device, the temperature of the ambient gas may be higher than the temperature of the base 1210. The first volume of ambient gas may be zero in some examples, for example where the first surface 1232 is flush with the first portion of the receptacle 1205. The ambient gas may provide an insulating layer, for example between the receptacle 1205 and a given surface of the receptacle holder. The presence and/or thickness of such an insulating gas layer may enable heat energy to be withdrawn from the second portion of the receptacle via the second surface 1242 at a lower rate than a rate of heat energy withdrawal from the first portion of the receptacle via the first surface 1232.

In this example, the first receptacle holder part 1230 also comprises a third surface 1234. The third surface 1234 is opposed from the first surface 1232 across the recess. The second receptacle holder part 1240 comprises a fourth surface 1244, opposed from the second surface 1242 across the recess. A first width of the recess taken between the first surface 1232 and the third surface 1234 is less than a second width of the recess taken between the second surface 1242 and the fourth surface 1244 in this example. As such, the recess may be wider in a plane further from the base 1210 than in a parallel plane closer to the base 1210.

In this example, the recess tapers towards the base 1210. In other examples, the width of the recess increases along an axis perpendicular to the base 1210 in a non-continuous manner. For example, the width of the recess may vary according to a step function, wherein a base portion of the recess abuts the receptacle 1205 and a non-base portion of the recess is spaced from the receptacle 1205 by a predetermined amount, the base portion and non-base portion being substantially parallel with respect to one another, e.g. within an acceptable manufacturing tolerance.

In the example shown in FIGS. 12 to 14, the first receptacle holder part 1230 and the second receptacle holder part 1240 have different values of a geometric property. For example, the geometric property may comprise a width of a recess taken between two opposing surfaces of a respective receptacle holder part, and/or a distance between a surface of the respective receptacle holder part and a corresponding surface of the receptacle during a freezing operation. Such a geometric property is an example of a heat flow characteristic of a given receptacle holder part, since the geometric property affects how heat energy may be transferred from the receptacle to the given receptacle holder part. For example, the thickness of an air layer between the receptacle and a given receptacle holder part may be determined according to a desired withdrawal rate of heat energy from the receptacle via the given receptacle holder part.

The devices described herein may be cooled using a variety of cooling equipment.

In some known systems, a fluid in a container, for example a fluid at room temperature, may be cooled by placing the container onto a cold surface that is maintained at a very low temperature, for example below −130° C. Placing the container on such a cold surface that is isothermal, that is having a fixed temperature, may cause a rapid change of temperature in the fluid.

Biological samples such as cells, however, are at risk of being damaged, or injured, during cooling, if such cooling is not controlled in an adequate manner. For example, as ice nucleation occurs and ice crystals form during cooling, cells may suffer direct damage from the ice crystals and also damage caused by an increase in concentration of solutes in the sample as progressively more ice is formed. Damaged cells may be less likely to recover and/or function when the sample is thawed.

Cooling a biological sample in a controlled manner may reduce the damage to the biological material caused by such effects and may thereby help to retain cell viability and function after thawing. For example, the biological sample may be cooled at a controlled rate which may be constant or may vary with time, according to a cooling protocol.

The cooling protocol may be implemented by a cooling apparatus, e.g. comprised as part of a cooling system such as the VIA Freeze™ equipment manufactured by Asymptote Limited. Some cooling systems blow cold gas over the sample which can cause an uneven cooling rate, or cooling profile (e.g. representing the change in cooling rate over time or temperature) across the sample or between samples where a plurality of samples are to be cooled by the cooling system. The VIA Freeze™ cooling system cools a sample by conduction on the underside of the sample and therefore every sample may experience the same cooling profile.

The cooling rate can depend on the nature of the sample being frozen. The sample quality, e.g. cell viability or function, on thawing may be severely reduced if the cooling rate after freezing is excessively fast or slow. Once frozen to, for example −80° C. or −100° C., the sample may be removed from the VIA Freeze™ system and placed in long term frozen storage.

Figure 15:
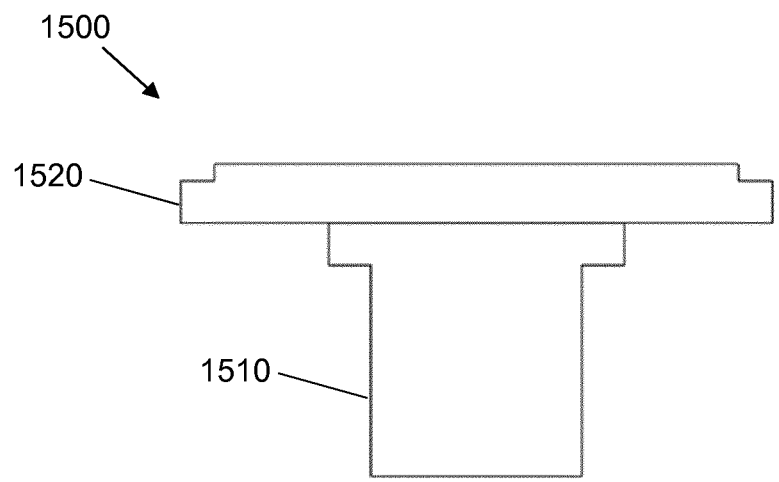
FIGS. 15 to 19 show schematically example cooling apparatuses.

FIG. 15 shows an example cooling apparatus 1500 for cooling a sample. The cooling apparatus 1500 may comprise a refrigerator or freezer device, for example a controlled rate freezer. In some examples, the cooling apparatus 1500 comprises and/or uses a cryocooler usable to cool the sample to a cryogenic temperature. A cryogenic temperature may be considered to be a temperature below −50° C., or below −180° C., as described above. For example, the cooling apparatus 1500 may be useable to cool the sample to −196° C. Examples of cryocoolers that may be used as the cooling apparatus 1500 include a Stirling cryocooler, an acoustic Stirling cryocooler, a Kleemenco cycle cryocooler, a pulse tube cryocooler, and a Joule-Thompson cryocooler.

The cooling apparatus 1500 comprises a cooler device 1510. In this example, the cooler device 1510 comprises a cold finger of the cooling apparatus 1500, which is a localised part of the cooling apparatus 1500 that is to be cooled during operation of the cooling apparatus 1500. The cooling apparatus 1500 may further comprise one or more compressors, pistons, heat exchangers or the like, for withdrawing heat from the cold finger 1510.

The cold finger 1510 may cool a heat conductive plate 1520, for example through direct contact with the heat conductive plate 1520. A device comprising a receptacle holder may be placed in contact with the heat conductive plate 1520. In some examples, the heat conductive plate 1520 is part of the device. The device may be one of the devices 200, 300, 400, 500, 600, 800, 900, 1200 described above. As such, the cooler device 1510 may be used to cool the devices 200, 300, 400, 500, 600, 800, 900, 1200.

Different types of receptacle holder may be used, for example to accommodate different types and/or sizes of receptacle. The receptacle holder, as part of a device described previously, for example, may be removable from the cooling apparatus 1500 to allow samples to be added or removed easily. The heat conductive plate 1520 and/or the cooler device 1510 may be considered to be a heat sink, in other words an area or part of the cooling apparatus 1500 that is to absorb or withdraw heat energy from the sample during a cooling operation performed on the sample.

The cooling apparatus 1500 may perform a cooling operation on the sample, and the cooling operation may be associated with a cooling profile. The cooling profile, or temperature profile, may be a dataset that comprises objective temperatures at time intervals of the cooling process. For example, the cooling profile describes how a measured temperature, e.g. of the sample, should change with time during the cooling operation. An objective cooling rate, e.g. change of temperature with time, may be set at different stages of the cooling profile. In some examples, a constant objective cooling rate may be set in the cooling profile.

The cooling profile may be pre-programmed into a control module configured to control operation of the cooling apparatus 1500. The control module may comprise control circuitry, e.g. including one or more processors and computer-readable storage with appropriate instructions executable by the one or more processors to control the cooling apparatus. For example, the control module may receive temperature data from one or more temperature sensors, or probes, representing a measured temperature of the sample, and/or cooling chamber in some examples, at a given time during the cooling operation. The control module may compare the received temperature data to an objective temperature value according to the particular cooling profile at a corresponding time, and may adjust the cooling operation based on the outcome of the comparison. For example, if the measured temperature at a given time were higher than a target temperature at a corresponding time according to the temperature profile, the control module may control the cooling operation to decrease the temperature of the entity being measured (i.e. the sample and/or chamber). Such comparisons and possible resulting adjustments may occur at predetermined times during the cooling operation, and/or may occur at a regular time interval. In this way, the control module may track the cooling profile in real time during the cooling operation, adjusting the cooling operation to follow the set cooling profile.

Figure 16:
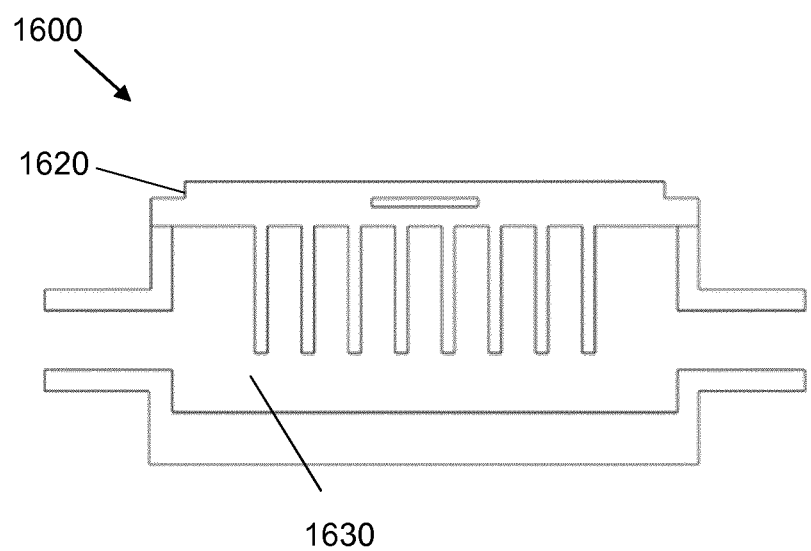

FIG. 16 shows an example cooling apparatus 1600 for cooling a sample.

In this example, a device comprising a receptacle holder may be cooled by contact with a high conductivity heat sink 1620. The heat sink 1620 may comprise a heat conductive plate. The heat sink 1620 may be cooled by the internal flow of cryogenic gas such as liquid nitrogen in a chamber 1630. The temperature of the heat sink 1620 may be isothermal throughout a cooling process or may be varied. The temperature of the heat sink 1620 may be controlled by modifying the flow of the gas through the chamber 1630, or by placing a heater on the top surface of the heat sink 1620 and controlling its temperature. The cooling process using the cooling apparatus 1600 may be a batch process allowing for the processing of single samples. The heat sink 1620 and/or the chamber 1610 may be considered a cooler device that is useable to cool a device such as the devices 200, 300, 400, 500, 600, 800, 900, 1200 described above.

Figure 17:
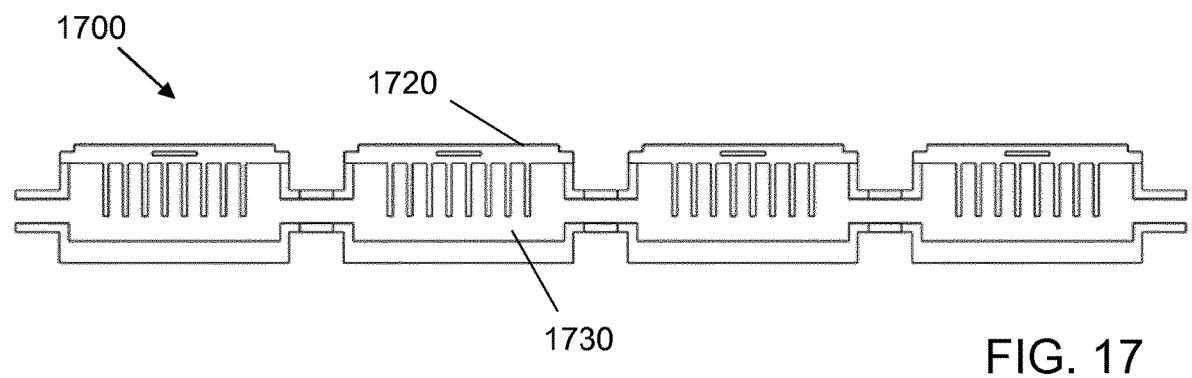

FIG. 17 shows an example cooling apparatus 1700 for cooling a sample.

The cooling apparatus 1700 comprises a plurality of heat sinks 1720 and a chamber 1730. The plurality of heat sinks 1720 may be cooled by the flow of cryogenic gas through the chamber. Each of the plurality of heat sinks 1720 may be configured to receive a respective device, each device comprising a respective receptacle holder. Different heat sinks may be configured to receive devices having different properties. For example, a first device that has a first characteristic temperature differential between first and second respective receptacle holder parts may be received by a first heat sink of the cooling apparatus 1700, and a second device having a second characteristic temperature differential between first and second respective receptacle holder parts may be received by a second heat sink of the cooling apparatus 1700. As such, different devices having different heat withdrawal properties may be cooled simultaneously by the cooling apparatus 1700. The cooling process using the cooling apparatus 1700 may allow cooling of multiple different samples simultaneously. The different samples may be of different sample types, different volumes, or be contained in different types of receptacle.

Figure 18:
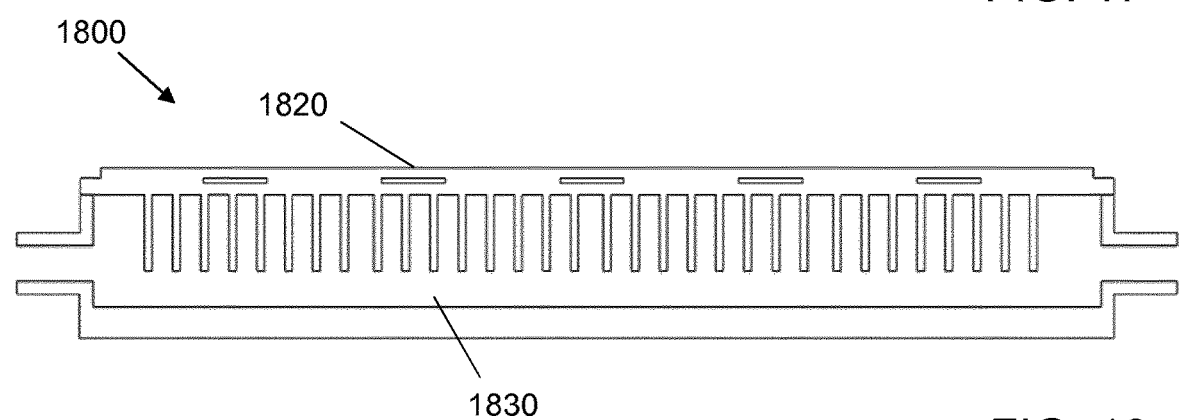

FIG. 18 shows an example cooling apparatus 1800 for cooling a sample. Some items depicted in FIG. 18 are similar to items shown in FIG. 17. Corresponding reference signs, incremented by 100, are therefore used for similar items, and corresponding descriptions should be taken to apply also.

The cooling apparatus 1800 comprises a heat sink 1820 and a chamber 1830. The heat sink 1820 may be cooled by the flow of cryogenic gas through the chamber 1830. A plurality of devices, each comprising a respective receptacle holder, may be placed on the heat sink 1820. Different devices having different heat withdrawal properties may be cooled simultaneously by the cooling apparatus 1800.

Figure 19:
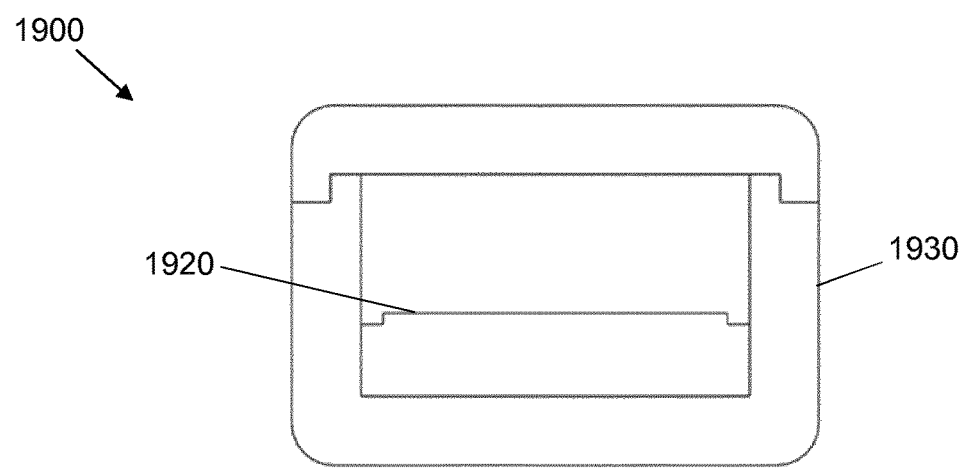

FIG. 19 shows an example cooling apparatus 1900 for cooling a sample.

The cooling apparatus 1900 comprises a heat sink 1920 and a freezer 1930. The freezer 1930 may be a laboratory freezer, for example a −80° C. freezer. The heat sink 1920 may be placed inside the freezer 1930 to passively cool the heat sink 1920. A device comprising a receptacle holder may be placed on the heat sink 1920 and may in turn be cooled by contact with the heat sink 1920.

Examples described above involve using a receptacle holder, of a device, having different parts with different heat withdrawal properties to establish a temperature gradient in a sample during cooling of the sample, in order to induce ice nucleation in a first region of the sample and prevent ice nucleation in a second region of the sample. Additionally and/or alternatively, such an effect may be achieved through use of a receptacle adapted to have different parts with different heat transfer properties, as described in the examples below. Such a receptacle may be used with one of the example devices described above, or may be used with a known receptacle holder.

Figure 20:
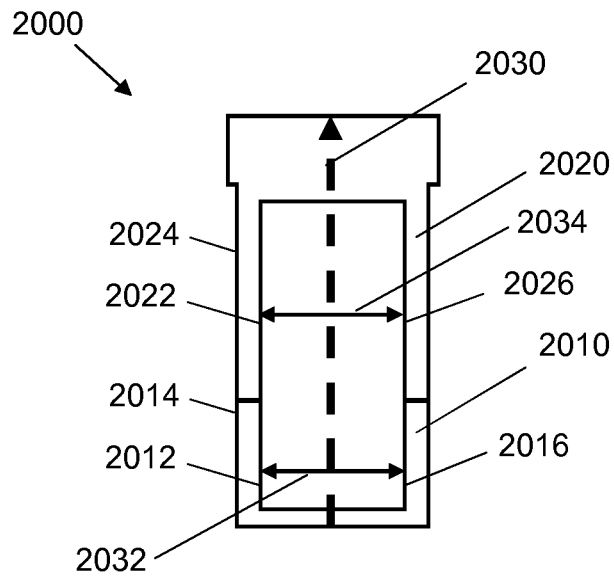
FIG. 20 shows schematically an example receptacle.

FIG. 20 shows a receptacle 2000 for use in freezing a biological sample contained therein. In this example, the receptacle 2000 is a cryovial, it being understood that the receptacle 2000 could be a different type of container or cryocontainer in other examples.

The receptacle 2000 comprises a first portion 2010. The first portion 2010 comprises a first inner surface 2012 and a first outer surface 2014. The first inner surface 2012 is an inner surface of the receptacle 2000 and the first outer surface 2014 is an outer surface of the receptacle. The first portion 2010 is configured to transfer heat energy from the first inner surface 2012 of the first portion 2010 to the first outer surface 2014 of the first portion 2010 at a first heat transfer rate.

The receptacle 2000 also comprises a second portion 2020. The second portion 2020 comprises a second inner surface 2022 and a second outer surface 2024. The second inner surface 2022 is an inner surface of the receptacle 2000. The second outer surface 2024 is an outer surface of the receptacle 2000. The second portion 2020 is configured to transfer heat energy from the second inner surface 2022 of the second portion 2020 to the second outer surface 2024 of the second portion 2020 at a second heat transfer rate. The second heat transfer rate is less than the first heat transfer rate. In some examples, the second heat transfer rate is greater than the first heat transfer rate.

In some examples, the first portion 2010 comprises a first material having a first value of a heat flow characteristic and the second portion 2020 comprises a second material having a second value of the heat flow characteristic. The second value is different from the first value. The heat flow characteristic may be a thermal conductivity. In some examples, a wall of the first portion 2010 and a wall of the second portion 2020 may have different thicknesses. For example, a distance between the first inner surface 2012 and the first outer surface 2014 taken in a plane substantially perpendicular with the major axis 2030 of the receptacle 2000 may be different than a distance between the second inner surface 2022 and the second outer surface 2016 taken in a plane substantially perpendicular with the major axis 2030 of the receptacle 2000. The major axis is for example a longitudinal axis of the receptacle.

In some examples, the heat flow characteristic is a geometric property. For example, the first portion 2010 may be wider than the second portion 2020. The width of a given receptacle portion may be taken perpendicular to the major axis 2030 of the receptacle 2000. The width of a given receptacle portion may correspond to the cross-section of the receptacle as a whole. As such, the first portion 2010 may be configured to have a greater contact area with a receptacle holder than the second portion 2020. In some examples, for example where the receptacle 2000 is cylindrical, the circumference of the first portion 2010 may be greater than that of the second portion 2020. In some examples, the radius of the first portion 2010 may be greater than that of the second portion 2020.

In some examples, the receptacle 2000 comprises an internal cavity, or volume, for receiving a biological sample. The first portion 2010 may comprise a third inner surface 2016 opposing the first inner surface 2012 across the cavity. The third inner surface 2016 opposes the first inner surface 2012 in a plane perpendicular to the major axis 2030 of the receptacle 2000. The second portion 2020 may comprise a fourth inner surface 2026 opposing the second inner surface 2022 across the cavity. The fourth inner surface 2026 opposes the second inner surface 2022 in a plane perpendicular to the major axis 2030 of the receptacle 2000. The plane between the second inner surface 2022 and the fourth inner surface 2026 is parallel to the plane between the first inner surface 2012 and the third inner surface 2016. A distance 2032 between the first inner surface 2012 and the third inner surface 2016 may be greater than a distance 2034 between the second inner surface 2022 and the fourth inner surface 2026. Therefore, the first portion 2010 may be wider than the second portion 2020. As such, the first portion 2010 may be configured to have greater heat flow properties than the second portion 2020, e.g. due to having a higher greater surface area than the second portion 2020.

In examples, a difference between the first heat transfer rate and the second heat transfer rate is at least sufficient to establish a temperature gradient within a sample in the receptacle 2000 such that, during a freezing operation with heat transfer via the first portion 2010 and the second portion 2020, ice nucleation occurs in a first region of the sample, the first region in contact with the first portion 2010, without ice nucleation in a second region of the sample, the second region in contact with the second portion 2020. Ice formation in the sample may therefore be controlled during cooling of the sample.

Figure 21:
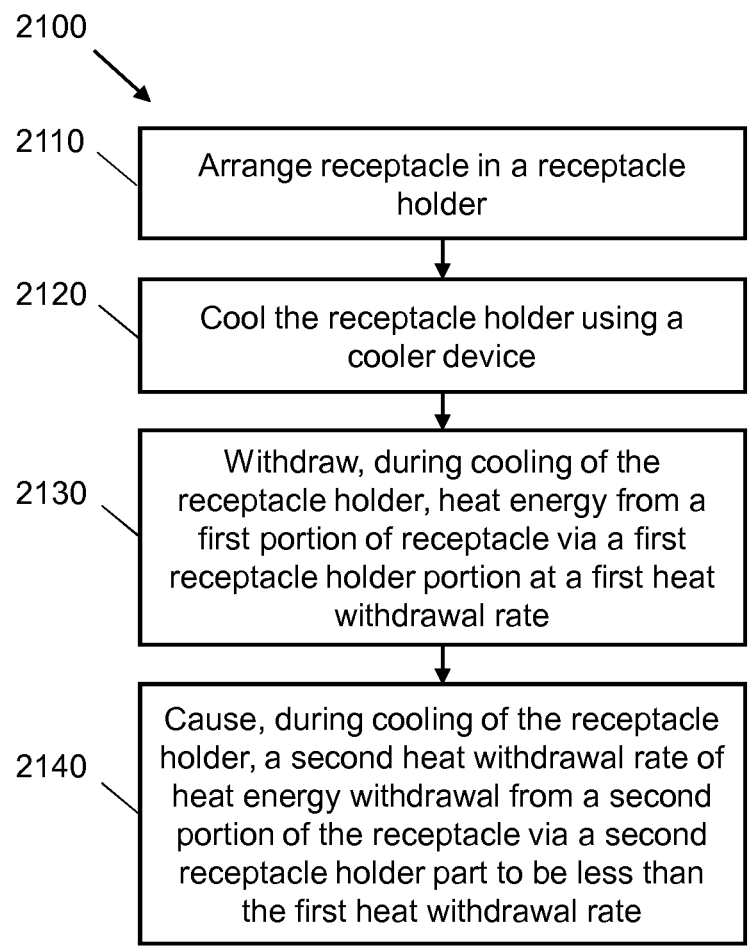
FIG. 21 is a flow diagram relating to examples of a method.

FIG. 21 shows a flow diagram illustrating a method 2100 of freezing part of a biological sample stored in a receptacle.

At block 2110, the receptacle containing the sample is arranged in a receptacle holder. The receptacle holder may be part of a device such as one of the devices 200, 300, 400, 500, 600, 800, 900, 1200 described above. In some examples, the receptacle holder is a different receptacle holder from that which is described as part of the devices 200, 300, 400, 500, 600, 800, 900, 1200. The receptacle may be the receptacle 2000 described above, in some examples.

At block 2120, the receptacle holder is cooled using a cooler device. For example, a base of the receptacle holder may be placed in contact with a cooling surface of the cooler device. The temperature of the cooling surface may vary during a cooling operation performed by the cooler device. The cooler device may comprise a cryocooler. In some examples, the receptacle holder is cooled at a controlled rate. For example, the receptacle holder may be cooled by a controlled rate freezer.

At block 2130, during cooling of the receptacle holder using the cooler device, heat energy is withdrawn from a first portion of the receptacle via a first receptacle holder part of the receptacle holder. The heat energy is withdrawn from the first portion of the receptacle via the first receptacle holder part at a first heat withdrawal rate. For example, the first portion of the receptacle may be arranged in conductive contact with the first receptacle holder part.

At block 2140, during cooling of the receptacle holder using the cooler device, a second heat withdrawal rate of heat energy withdrawal from a second portion of the receptacle via a second receptacle holder part of the receptacle holder is caused to be less than the first heat withdrawal rate. The second receptacle holder part may be further from the base of the receptacle holder than the first receptacle holder part. In some examples, heat energy is withdrawn from the second portion of the receptacle via the second receptacle holder part at the second heat withdrawal rate. A difference between the first heat withdrawal rate and the second heat withdrawal rate may be at least sufficient to establish a temperature gradient within the biological sample such that, during a freezing operation using the cooler device, nucleation of the sample occurs in a first region of the sample, the first region in contact with the first portion of the receptacle, without nucleation of the sample in a second region of the sample, the second region in contact with the second portion of the receptacle.

Figure 22:
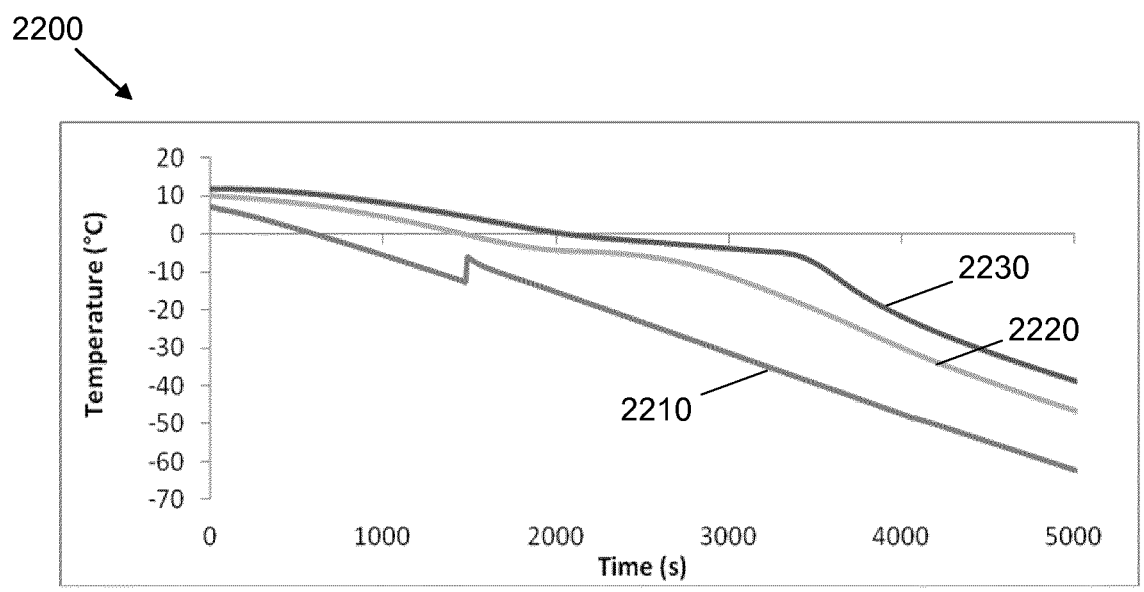
FIG. 22 shows a representation of an example data series of temperature values and corresponding time values.

FIG. 22 shows an example representation 2200 of temperature versus time in a sample undergoing a freezing operation with progressive solidification.

In FIG. 22, a first line 2210 corresponds to measured data obtained by a first thermocouple in a base region of the sample, a second line 2220 corresponds to measured data obtained by a second thermocouple in a middle region of the sample, and a third line 2230 corresponds to measured data obtained by a third thermocouple in an upper region of the sample. The sample was cooled using the methods as described herein.

As shown in FIG. 22, the base region of the sample undercools to around −10° C., and upon ice nucleation in the base region the temperature in the base region rapidly increases. However, there is no corresponding temperature jump in the middle or upper regions of the sample, nor is there undercooling in those regions. Therefore, apart from the region in which nucleation occurs, the remainder of the sample may freeze without undercooling, thus improving cell viability at least in regions of the sample other than the base region. Following ice nucleation in the base region, ice may form across the whole sample. As an illustrative example, the post-thawing viability of induced pluripotent stem cell (iPS)-derived neurones and mammalian embryos may be improved through use of measures described herein. The post-thawing viability of cells of other types, and of other types of biological material, may also be improved by the measures described herein.

The above examples are to be understood as illustrative. Further examples are envisaged.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope defined in the accompanying claims.

The invention claimed is:

1. A device for use in freezing at least part of a biological sample in a receptacle, the device comprising:
   a base;
   a plurality of walls extending from the base, wherein each wall of the plurality of walls comprises at least one cutout configured to partially receive the receptacle therein, such that the receptacle is not fully enclosed; and
   a receptacle holder comprising:
      a first part in contact with a first portion of the receptacle configured to, with the receptacle held by the receptacle holder during cooling of the base using a cooler device, withdraw heat energy from the first portion of the receptacle at a first heat withdrawal rate; and
      a second part in contact with a second portion of the receptacle configured such that, with the receptacle held by the receptacle holder during cooling of the base using the cooler device, a second heat withdrawal rate of heat energy withdrawal from the second portion of the receptacle via the second part is less than the first heat withdrawal rate;
   wherein the first part and the second part simultaneously cool the first portion of the receptacle and the second portion of the receptacle at the first heat withdrawal rate and the second heat withdrawal rate, respectively.

2. The device according to claim 1, wherein the first part is configured to at least partially surround the first portion and the second part is configured to at least partially surround the second portion.

3. The device according to claim 1, wherein the first part is closer to the base than the second part.

4. The device according to claim 1, wherein the second part is configured to withdraw heat energy from the second portion of the receptacle at the second heat withdrawal rate.

5. The device according to claim 1, wherein a difference between the first heat withdrawal rate and the second heat withdrawal rate is at least sufficient to establish a temperature gradient within a sample in the receptacle such that, during a freezing operation using the cooler device, ice nucleation occurs in a first region of the sample, the first region in contact with the first portion of the receptacle, without ice nucleation in a second region of the sample, the second region in contact with the second portion of the receptacle.

6. The device according to claim 1, wherein a difference between the first heat withdrawal rate and the second heat withdrawal rate is such that, for a sample having a volume of 5 millilitres in the receptacle, a temperature difference between a first region of the sample in contact with the first portion of the receptacle and a second region of the sample in contact with the second portion of the receptacle during cooling of the base is at least 15 degrees Celsius.

7. The device according to claim 1, wherein the first part comprises a metal and the second part comprises a polymer.

8. The device according to claim 1, wherein the first part comprises a first material with a first value of a heat flow characteristic and the second part comprises a material with a second value of the heat flow characteristic, different from the first value.

9. The device according to claim 8, wherein the heat flow characteristic is a thermal conductivity.

10. The device according to claim 9, wherein the first value comprises a thermal conductivity of at least 10 W/mK.

11. The device according to claim 9, wherein the second value comprises a thermal conductivity of at most 1 W/mK.

12. The device according to claim 1, wherein the base comprise a plate and the first part is part of a surface of the plate.

13. The device according to claim 1, wherein the base comprises a plate and wherein the first part is a first wall part of each of the plurality of walls and the second part is a second wall part of each of the plurality of walls.

14. The device according to claim 13, wherein each of the plurality of walls comprises an opening through the wall.

15. The device according to claim 14, wherein a first width of the opening is narrower than a second width of the opening, the first width closer to the base than the second width.

16. The device according to claim 13, wherein a base portion of each of the plurality of walls is wider than a non-base portion of each of the plurality of walls, the base portion of the wall being closer to the base than the non-base portion of the wall.

17. The device according to claim 13, wherein each of the plurality of walls is slidably mounted on the base.

18. The device according to claim 1, wherein the receptacle holder is configured to hold the receptacle along a freezing operation temperature gradient axis extending away from the base, the first part comprising a first surface and the second part comprising a second surface further from the temperature gradient axis than the first surface.

19. The device according to claim 18, wherein the receptacle holder is configured such that, with the receptacle held by the receptacle holder, a first volume of ambient gas between the first surface and the first portion of the receptacle is less than a second volume of ambient gas between the second surface and the second portion of the receptacle.

20. The device according to claim 1, the first part comprising a first surface and the second part comprising a second surface, the receptacle holder comprising a recess to receive the receptacle, the first part comprising a third surface opposed from the first surface across the recess, and the second part comprising a fourth surface opposed from the second surface across the recess, wherein a first width of the recess taken between the first surface and the third surface is less than a second width of the recess taken between the second surface and the fourth surface.

21. The device according to claim 20, wherein the recess tapers towards the base.

22. The device according to claim 1, wherein the base is contactable with a cooling surface of the cooler device.

23. A receptacle for use in freezing a biological sample contained therein, the receptacle comprising:
 a first portion configured to transfer heat energy from a first inner surface of the first portion to a first outer surface of the first portion at a first heat transfer rate; and
 a second portion configured to transfer heat energy from a second inner surface of the second portion to a second outer surface of the second portion at a second heat transfer rate, the second heat transfer rate less than the first heat transfer rate;
 wherein the first portion and the second portion simultaneously transfer energy at the first heat transfer rate and the second heat transfer rate, respectively.

24. The receptacle according to claim 23, wherein the first portion comprises a first material having a first value of a heat flow characteristic and the second portion comprises a second material having a second value of the heat flow characteristic, different from the first value.

25. The receptacle according to claim 24, wherein the heat flow characteristic is a thermal conductivity.

26. The receptacle according to claim 23, wherein the receptacle comprises an internal cavity for receiving a biological sample, the first portion comprising a third inner surface opposing the first inner surface across the internal cavity, the second portion comprising a fourth inner surface opposing the second inner surface across the internal cavity, wherein a distance between the first inner surface and the third inner surface is greater than a distance between the second inner surface and the fourth inner surface.

27. The receptacle according to claim 23, wherein a difference between the first heat transfer rate and the second heat transfer rate is at least sufficient to establish a temperature gradient within a sample in the receptacle such that, during a freezing operation with heat transfer via the first portion and the second portion, ice nucleation occurs in a first region of the sample, the first region in contact with the first portion, without ice nucleation in a second region of the sample, the second region in contact with the second portion.

28. A method of freezing part of a biological sample in a receptacle, the method comprising:
 arranging the receptacle in a receptacle holder formed of a base and a plurality of walls extending from the base, wherein each wall of the plurality of walls comprises at least one cutout configured to partially receive the receptacle therein, such that the receptacle is not fully enclosed;
 cooling the receptacle holder using a cooler device;
 withdrawing, during cooling of the receptacle holder using the cooler device, heat energy from a first portion of the receptacle via a first receptacle holder part of the receptacle holder, in contact with the first portion of the receptacle, at a first heat withdrawal rate; and
 causing, during cooling of the receptacle holder using the cooler device, a second heat withdrawal rate of heat energy withdrawal from a second portion of the receptacle via a second receptacle holder part of the receptacle holder, in contact with the second portion of the receptacle, to be less than the first heat withdrawal rate;
 wherein the first portion and the second portion are simultaneously cooled at the first heat withdrawal rate and the second heat withdrawal rate, respectively.

29. The method according to claim 28, comprising withdrawing, during cooling of the receptacle holder using the cooler device, heat energy from the second portion of the sample via the second receptacle holder part at the second heat withdrawal rate.

30. The method according to claim 28, wherein a difference between the first heat withdrawal rate and the second heat withdrawal rate is at least sufficient to establish a temperature gradient within the biological sample such that, during a freezing operation using the cooler device, ice nucleation occurs in a first region of the biological sample, the first region in contact with the first portion of the receptacle, without ice nucleation in a second region of the biological sample, the second region in contact with the second portion of the receptacle.

\* \* \* \* \*

UNITED STATES PATENT AND TRADEMARK OFFICE
CERTIFICATE OF CORRECTION

| | | |
|---|---|---|
| PATENT NO. | : 12,207,650 B2 | Page 1 of 1 |
| APPLICATION NO. | : 16/955858 | |
| DATED | : January 28, 2025 | |
| INVENTOR(S) | : Morris et al. | |

It is certified that error appears in the above-identified patent and that said Letters Patent is hereby corrected as shown below:

On the Title Page

Item [73], delete "ASYMPTOTE LIMITED" and insert -- BIOSAFE SA --

Signed and Sealed this
Seventeenth Day of June, 2025

Coke Morgan Stewart
*Acting Director of the United States Patent and Trademark Office*